(12) United States Patent
Tsubaki

(10) Patent No.: US 10,583,857 B2
(45) Date of Patent: Mar. 10, 2020

(54) ELECTRIC POWER STEERING APPARATUS

(71) Applicant: NSK Ltd., Tokyo (JP)

(72) Inventor: Takahiro Tsubaki, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/086,375

(22) PCT Filed: Feb. 2, 2018

(86) PCT No.: PCT/JP2018/003589
§ 371 (c)(1),
(2) Date: Sep. 19, 2018

(87) PCT Pub. No.: WO2018/143408
PCT Pub. Date: Aug. 9, 2018

(65) Prior Publication Data
US 2019/0359247 A1 Nov. 28, 2019

(30) Foreign Application Priority Data

Feb. 3, 2017 (JP) .................................. 2017-018342
Feb. 20, 2017 (JP) .................................. 2017-029274

(51) Int. Cl.
*B62D 5/04* (2006.01)
*B62D 1/28* (2006.01)
*B62D 15/02* (2006.01)
*B62D 6/00* (2006.01)

(52) U.S. Cl.
CPC ........... *B62D 5/0463* (2013.01); *B62D 1/286* (2013.01); *B62D 15/021* (2013.01); *B62D 6/007* (2013.01); *B62D 15/025* (2013.01)

(58) Field of Classification Search
CPC ..... B62D 5/0463; B62D 1/286; B62D 15/021
See application file for complete search history.

(56) References Cited

U.S. PATENT DOCUMENTS 10,358,163 B2 * 7/2019 Tsubaki ............ B62D 15/0285
10,358,164 B2 * 7/2019 Wilhelm .................. B62D 6/10
(Continued)

FOREIGN PATENT DOCUMENTS

JP  2002-002519 A  1/2002
JP  2004-017881 A  1/2004
(Continued)

OTHER PUBLICATIONS

Written Opinion of the International Searching Authority of PCT/JP2018/003589 dated Apr. 17, 2018.
(Continued)

*Primary Examiner* — Tony H Winner
(74) *Attorney, Agent, or Firm* — Sughrue Mion, PLLC

(57) ABSTRACT

[Problem]
An object of the present invention is to provide an electric power steering apparatus that achieves a manual steering even if a steering intervention is performed by a driver during an automatic steering, ensures more safety when a driver steers urgently, and enables both an assist control and a steering angle control.
[Means for Solving the Problem]
An electric power steering apparatus comprises a steering angle control section that calculates a steering angle control current command value for the steering angle control based on at least a steering angle command value and an actual steering angle, the steering angle control section comprises a position control section that calculates a basic steering angular velocity command value, a steering intervention compensating section that obtains a compensatory steering angular velocity command value, a filter section that converts a steering angular velocity calculated from the basic steering angular velocity command value and the compensatory steering angular velocity command value into an
(Continued)

extended steering angular velocity command value, and a steering angular velocity control section that calculates the steering angle control current command value based on the extended steering angular velocity command value and an actual steering angular velocity, wherein the steering intervention compensating section comprises a compensation map section, and obtains the compensatory steering angular velocity command value for the steering torque.

14 Claims, 25 Drawing Sheets

(56) References Cited

U.S. PATENT DOCUMENTS

| | | |
|---|---|---|
| 2001/0054519 A1 | 12/2001 | Nishiwaki et al. |
| 2015/0191200 A1 | 7/2015 | Tsubaki et al. |
| 2018/0154936 A1* | 6/2018 | Yamasaki ............ B62D 5/0484 |
| 2018/0186406 A1* | 7/2018 | Itou ........................ B62D 1/286 |
| 2019/0210638 A1* | 7/2019 | Ueno ....................... B62D 5/04 |

FOREIGN PATENT DOCUMENTS

| | | |
|---|---|---|
| JP | 3912279 B2 | 5/2007 |
| JP | 3917008 B2 | 5/2007 |
| WO | 2014/136515 A1 | 9/2014 |

OTHER PUBLICATIONS

International Search Report of PCT/JP2018/003589 dated Apr. 17, 2018.

\* cited by examiner

PRIOR ART

ELECTRIC POWER STEERING APPARATUS

CROSS REFERENCE TO RELATED APPLICATIONS

This application is a National Stage of International Application No. PCT/JP2018/003589 filed Feb. 2, 2018, claiming priority based on Japanese Patent Application No. 2017-018342 filed Feb. 3, 2017 and Japanese Patent Application No. 2017-029274 filed Feb. 20, 2017.

TECHNICAL FIELD

The present invention relates to an electric power steering apparatus that also enables an automatic steering by performing an assist control and a steering angle control to a steering system by drive-controlling a motor based on a current command value, and in particular to the electric power steering apparatus that enables a safety and a reduction of an uncomfortable feeling even if a steering intervention is performed by a driver during the automatic steering.

BACKGROUND ART

An electric power steering apparatus (EPS) which provides a steering system of a vehicle with a steering assist torque (an assist torque) by means of a rotational torque of a motor, applies a driving force of the motor as the steering assist torque to a steering shaft or a rack shaft by means of a transmission mechanism such as gears or a belt through a reduction mechanism, and performs an assist control. In order to accurately generate the assist torque, such a conventional electric power steering apparatus performs a feedback control of a motor current. The feedback control adjusts a voltage supplied to the motor so that a difference between a steering assist command value (a current command value) and a detected motor current value becomes small, and the adjustment of the voltage supplied to the motor is generally performed by an adjustment of a duty ratio of pulse width modulation (PWM) control.

A general configuration of the conventional electric power steering apparatus will be described with reference to FIG. 1. As shown in FIG. 1, a column shaft (a steering shaft or a handle shaft) 2 connected to a handle 1 is connected to steered wheels 8L and 8R through reduction gears (worm gears) 3 constituting the reduction mechanism, universal joints 4a and 4b, a rack-and-pinion mechanism 5, and tie rods 6a and 6b, further via hub units 7a and 7b. In addition, a torsion bar is inserted into the column shaft 2, for which a steering angle sensor 14 for detecting a steering angle θ of the handle 1 by means of a torsion angle of a torsion bar and a torque sensor 10 for detecting a steering torque Tt are provided, and a motor 20 for assisting a steering force of the handle 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist control command based on the steering torque Tt detected by the torque sensor 10 and a vehicle speed V detected by a vehicle speed sensor 12, and controls a current supplied to the motor 20 by means of a voltage control command value Vref obtained by performing a compensation or the like for the current command value.

Moreover, the steering angle sensor 14 is not essential, it does not need to be provided, and it is possible to obtain the steering angle from a rotational angle sensor such as a resolver connected to the motor 20.

A controller area network (CAN) 40 exchanging various information of a vehicle is connected to the control unit 30, and it is possible to receive the vehicle speed V from the CAN 40. Further, it is also possible to connect a non-CAN 41 exchanging a communication, analog/digital signals, a radio wave or the like except with the CAN 40 to the control unit 30.

The control unit 30 mainly comprises a CPU (a Central Processing Unit) (including an MPU (a Micro Processor Unit), an MCU (a Micro Controller Unit) and so on), and general functions performed by programs within the CPU are shown in FIG. 2.

The control unit 30 will be described with reference to FIG. 2. As shown in FIG. 2, the steering torque Tt detected by the torque sensor 10 and the vehicle speed V detected by the vehicle speed sensor 12 (or from the CAN 40) are inputted into a current command value calculating section 31 that calculates a current command value Iref1. The current command value calculating section 31 calculates the current command value Iref1 that is a control target value of a current supplied to the motor 20 based on the inputted steering torque Tt and vehicle speed V and by using an assist map or the like. The current command value Iref1 is inputted into a current limiting section 33 through an adding section 32A. A current command value Irefm the maximum current of which is limited is inputted into a subtracting section 32B, and a deviation I (=Irefm−Im) between the current command value Irefm and a motor current Im being fed-back is calculated. The deviation I is inputted into a proportional-integral (PI)-control section 35 for improving a characteristic of the steering operation. The voltage control command value Vref whose characteristic is improved by the PI-control section 35 is inputted into a PWM-control section 36. Furthermore, the motor 20 is PWM-driven through an inverter 37. The motor current Im of the motor 20 is detected by a motor current detector 38 and is fed-back to the subtracting section 32B. The inverter 37 is comprised of a bridge circuit of field-effect transistors (FETs) as semiconductor switching elements.

A rotational angle sensor 21 such as a resolver is connected to the motor 20, and a rotational angle θ is detected and outputted by the rotational angle sensor 21.

Further, a compensation signal CM from a compensation signal generating section 34 is added to the adding section 32A, and a characteristic compensation of the steering system is performed by the addition of the compensation signal CM so as to improve a convergence, an inertia characteristic and so on. The compensation signal generating section 34 adds a self-aligning torque (SAT) 34C and an inertia 34B at an adding section 34D, further adds the result of addition performed at the adding section 34D with a convergence 34A at an adding section 34E, and then outputs the result of addition performed at the adding section 34E as the compensation signal CM.

Research and development of an automatic driving technique of a vehicle have been recently advanced, and proposals where an electric power steering apparatus (EPS) is applied to the automatic steering included in the technique, have been made. In the case of achieving the automatic steering by the EPS, the EPS has a mechanism for the assist control performed by a conventional EPS and a mechanism for the steering angle control of controlling the steering system so that the vehicle runs in a desired direction independently, and is generally configured so as to make outputs of these mechanisms possible to adjust. Further, in the steering angle control, a position and velocity control having superior performance of responsiveness to a steering angle command being a control target of the steering angle and a disturbance suppression characteristic for a road surface reaction force and so on, is used, for example, the proportional (P) control is adopted in the position control, and the proportional-integral (PI) control is adopted in the velocity control.

In the case of performing the assist control and the steering angle control independently and performing the whole control by switching the command values being outputs of both controls, switching them by a switch or the like suddenly may cause the uncomfortable feeling to the driver since the command value is suddenly changed and behavior of a handle becomes unnatural. In order to resolve this problem, in the case of switching between a torque control method (corresponding to the assist control) and a rotational angle control method (corresponding to the steering angle control), an apparatus disclosed in Japanese Unexamined Patent Publication No. 2004-17881 A (Patent Document 1) sets a value obtained by multiplying respective command values of both methods with coefficients (an automatic coefficient and a manual coefficient) and adding the multiplied results on a final command value, gradually changes these coefficients, and suppresses an abrupt change of the command value. The apparatus uses the P-control in the position control of the rotational angle control method, and uses the PI-control in the velocity control.

In the publication of Japanese Patent No. 3917008 B2 (Patent Document 2), an automatic steering control apparatus is proposed that automatically performs a handle operation depending on a set steering angle and aims at parking assist in particular. This apparatus can switch between a torque control mode (corresponding to the assist control) and a parking assist mode (corresponding to the steering angle control), and performs the control by using prestored parking data in the parking assist mode. Further, the apparatus performs the P-control in the position control of the parking assist mode, and performs the PI-control in the velocity control.

The publication of Japanese Patent No. 3912279 B2 (Patent Document 3) does not directly apply the EPS, however, when an apparatus disclosed in Patent Document 3 starts the steering angle control by switching a mode to an automatic steering mode, the apparatus reduces the uncomfortable feeling to the driver caused by an abrupt change of the handle at the start by gradually increasing a steering velocity (a steering angular velocity).

THE LIST OF PRIOR ART DOCUMENTS

Patent Documents

Patent Document 1: Japanese Unexamined Patent Publication No. 2004-17881 A
Patent Document 2: Japanese Patent No. 3917008 B2
Patent Document 3: Japanese Patent No. 3912279 B2

SUMMARY OF THE INVENTION

Problems to be Solved by the Invention

However, in Patent Document 1, since the command value for the steering angle control (the steering angle control command value) is limited by the coefficient and is outputted to the final command value while the method is switched, the final command value decreases by the limited amount. Since an actual velocity of the motor becomes slow because of this limitation compared with a command value for the steering angular velocity (the steering angular velocity command value) calculated by the steering angle control command value, a deviation occurs between the steering angular velocity command value and the actual velocity, an integral value of an integral (I) control in the velocity control accumulates, and a larger steering angle control command value is outputted from the velocity control. As a result, since the limitation due to the coefficient is relieved in the state where the coefficient by which a command value for the assist control (the assist control command value) is multiplied gradually increases, the steering angle control command value becomes an excessive value as the coefficient increases, the handle reacts for the steering angular velocity command value excessively, and it may cause the uncomfortable feeling such as catching feeling and unpleasantness to the driver.

Further, the apparatus disclosed in Patent Document 1 uses the P-control in the position control and the PI-control in the velocity control. When the manual input of the driver intervenes in the steering angle control, the steering angle control operates so as to follow the steering angle control command value, and it is difficult to steer by the hands until the switching from the steering angle control to the assist control is performed. Furthermore, a time delay occurs due to the detection of the manual input and the switching, and the operation for steering intervention by the driver may not be performed sufficiently.

The apparatus disclosed in Patent Document 2 also performs the steering angle control by using the P-control in the position control and the PI-control in the velocity control. In the case of performing the steering angle control in the vehicle, a disturbance and a load state are significantly changed by the vehicle speed, the friction, a change of the road surface reaction force and so on, so that the apparatus must have a control configuration being resistant to them. However, in the control configuration of the apparatus described in Patent Document 2 alone, for example, in the case that the road surface reaction force changes, or in the case that a target steering angle changes rapidly, a vibration occurs due to a natural vibration caused by a mass damper of the handle and a spring of the torsion bar, and the driver may feel it as the uncomfortable feeling or the unpleasantness.

The apparatus disclosed in Patent Document 3 gradually increases the steering angular velocity at the start of the steering angle control, and since the steering angular velocity continues increasing until an upper limit after beginning to increase, the integral value of the I-control accumulates excessively. As a result, the steering angle control command value becomes an excessive value, the handle reacts to the steering angular velocity command value excessively, and it may cause the uncomfortable feeling to the driver.

The present invention has been developed in view of the above-described circumstances, and an object of the present invention is to provide the electric power steering apparatus that achieves the manual steering even if the steering intervention is performed by the driver during the automatic steering, ensures more safety when the driver steers urgently, and enables both the assist control and the steering angle control.

Means for Solving the Problems

The present invention relates to an electric power steering apparatus that drives a motor based on a current command value, and performs an assist control and a steering angle control for a steering system by drive-controlling the motor, the above-described object of the present invention is achieved by that comprising: a steering angle control section that calculates a steering angle control current command value for the steering angle control based on at least a steering angle command value and an actual steering angle, wherein the steering angle control section comprises: a position control section that calculates a basic steering angular velocity command value based on the steering angle command value and the actual steering angle; a steering intervention compensating section that obtains a compensatory steering angular velocity command value for a steering intervention compensation depending on a steering torque; a filter section that converts a steering angular velocity calculated from the basic steering angular velocity command value and the compensatory steering angular velocity command value into an extended steering angular velocity command value by using a feed-forward filter (an FF filter); and a steering angular velocity control section that calculates the steering angle control current command value based on the extended steering angular velocity command value and an actual steering angular velocity, wherein the steering intervention compensating section comprises a compensation map section having a steering intervention compensation map that determines a characteristic of the compensatory steering angular velocity command value for the steering torque, wherein the steering intervention compensating section obtains the compensatory steering angular velocity command value from the steering torque through the compensation map section, and the electric power steering apparatus calculates the current command value by using at least the steering angle control current command value.

The above-described object of the present invention is efficiently achieved by that: wherein the steering intervention compensating section further includes a dead band setting section that sets values within a predetermined range to zero for the steering torque, and obtains the compensatory steering angular velocity command value from the steering torque through the dead band setting section and the compensation map section; or wherein the steering intervention compensation map has a characteristic that the compensatory steering angular velocity command value increases as the steering torque increases; or wherein the steering intervention compensation map has a characteristic that the compensatory steering angular velocity command value decreases as a vehicle speed increases;
or wherein the steering intervention compensating section further includes a steering intervention phase compensating section that performs a phase compensation for the steering torque, and obtains the compensatory steering angular velocity command value from the steering torque through further the steering intervention phase compensating section;
or wherein the steering angular velocity control section calculates the steering angle control current command value with an integral-proportional control (an I-P control) by using the extended steering angular velocity command value and the actual steering angular velocity;
or wherein the position control section includes a proportional gain section that calculates the basic steering angular velocity command value by multiplying a deviation between the steering angle command value and the actual steering angle with a proportional gain;
or wherein the electric power steering apparatus further includes an assist control section that calculates an assist control current command value for the assist control based on at least the steering torque, and calculates the current command value by the assist control current command value and the steering angle control current command value;
or wherein the assist control current command value is multiplies with an assist control output gradual-change gain for adjusting the assist control current command value;
or wherein an assist map output current obtained in the assist control section is multiplied with an assist map gradual-change gain;
or wherein only the steering angle control, for the steering system, is performed by multiplying the assist control current command value with the assist control output gradual-change gain being zero;
or further including a steering angle control current command value limiting section that limits the steering angle control current command value with a preset limit value.

Effects of the Invention

According to the electric power steering apparatus of the present invention, in the steering angle control, it is possible to reduce an uncomfortable feeling of the driver with a safety even if the steering intervention is performed during the automatic steering because the compensation of the steering intervention is performed by using the map.

MODE FOR CARRYING OUT THE INVENTION

An electric power steering apparatus (EPS) according to the present invention performs an assist control being a function of a conventional EPS and a steering angle control necessary to an automatic steering in an automatic driving. The assist control and the steering angle control are performed at an assist control section and a steering angle control section respectively, and the electric power steering apparatus calculates a current command value for drive-controlling a motor by using an assist control current command value and a steering angle control current command value outputted from respective sections. Both of the steering angle control and the assist control are performed in the automatic steering (the automatic steering state), and the assist control is performed in the manual steering (the manual steering state) when a driver takes part in steering. In order to reduce the uncomfortable feeling caused by a steering intervention during the automatic steering, a steering intervention compensation is performed corresponding to the steering torque. Concretely, a steering angular velocity command value is compensated by means of a compensation value (a compensatory steering angular velocity command value) obtained at a steering intervention compensating section by using a prepared steering intervention compensation map. A process using a feed-forward filter (an FF filter) is performed for the compensated steering angular velocity command value, and the steering angular velocity control is performed by using a processed steering angular velocity command value (an extended steering angular velocity command value). Thereby, the responsiveness in the steering angle control and the steering intervention can be improved.

Hereinafter, embodiments of the present invention will be described with reference to the accompanying drawings.

First, a whole vehicle system including the electric power steering apparatus according to the present invention will be described.

Figure 3:
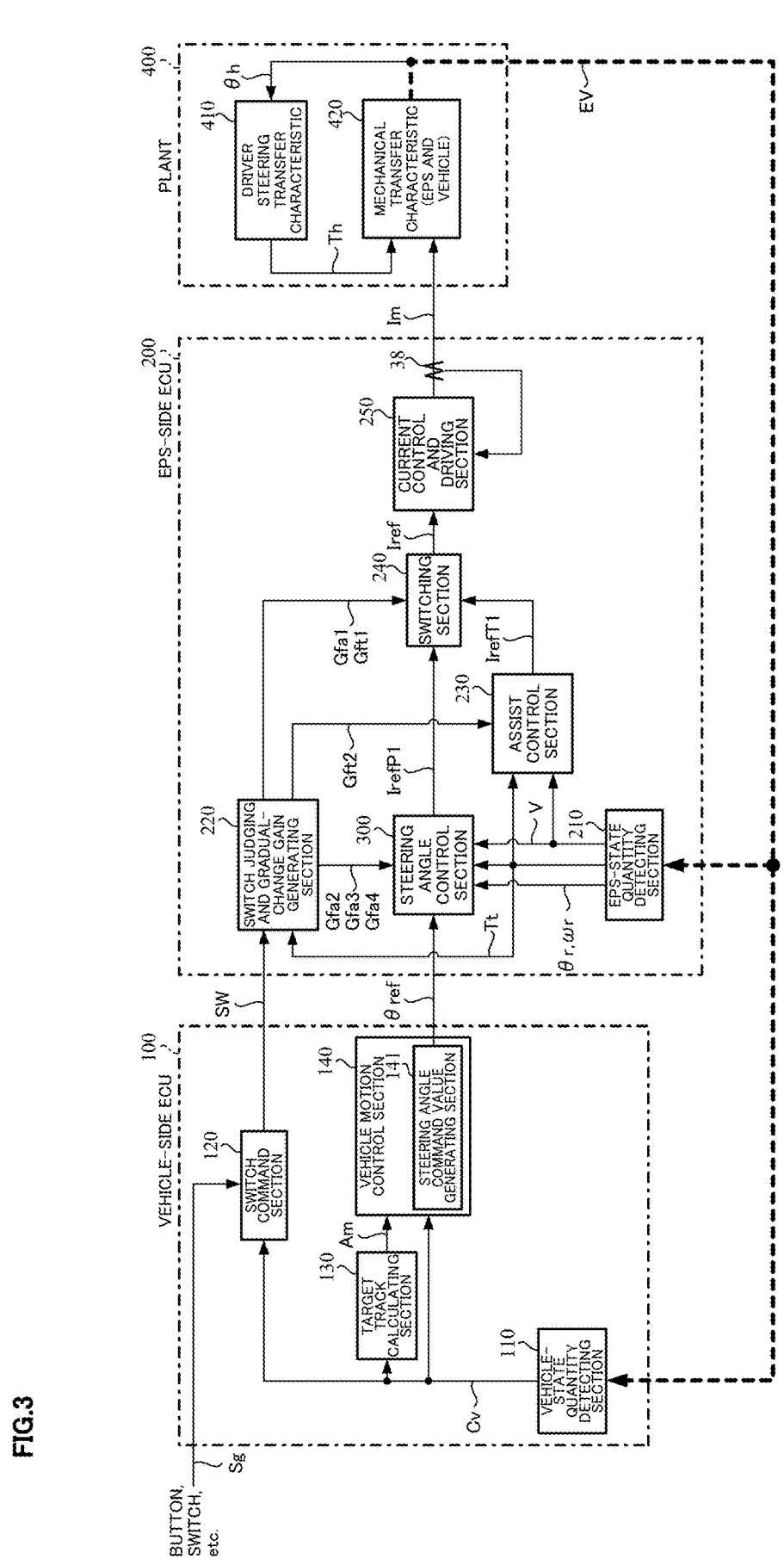
FIG. 3 is a block diagram showing a configuration example of a whole vehicle system relating to the present invention.

FIG. 3 shows a configuration example (the first embodiment) of the whole vehicle system relating to the present invention, which comprises an ECU (hereinafter referred to a "vehicle-side ECU") 100 equipped for a vehicle, an ECU (hereinafter referred to an "EPS-side ECU") 200 equipped for the EPS, and a plant 400.

The vehicle-side ECU 100 comprises a vehicle-state quantity detecting section 110, a switch command section 120, a target track calculating section 130 and a vehicle motion control section 140.

The vehicle-state quantity detecting section 110 comprises an on-vehicle camera, a distance sensor, an angular velocity sensor, an acceleration sensor and so on, and outputs data detected by them as a vehicle-state quantity Cv to the switch command section 120, the target track calculating section 130 and the vehicle motion control section 140.

The switch command section 120 inputs a signal Sg for switching an operation mode from a button, a switch or the like provided for a dashboard or the like with the vehicle-state quantity Cv, and outputs a switch signal SW to the EPS-side ECU 200. The operation mode has "an assist control mode" and "a steering angle control mode", "the assist control mode" is a mode corresponding to the manual steering, and "the steering angle control mode" is a mode corresponding to the automatic steering. The switch command section 120 determines the operation mode considering respective data included in the vehicle-state quantity Cv based on the signal Sg which shows an intention of the driver, and outputs the determined operation mode as the switch signal SW.

The target track calculating section 130 calculates a target track Am by an existing known method based on the vehicle-state quantity Cv, and outputs the target track Am to the vehicle motion control section 140.

The vehicle motion control section 140 includes a steering angle command value generating section 141. The steering angle command value generating section 141 generates a steering angle command value Ore f being a control target value of the steering angle based on the target track Am and the vehicle-state quantity Cv, and outputs the steering angle command value θref to the EPS-side ECU 200.

The EPS-side ECU 200 comprises an EPS-state quantity detecting section 210, a switch judging and gradual-change gain generating section 220, a steering angle control section 300, an assist control section 230, a switching section 240, a current control and driving section 250 and a motor current detector 38.

The EPS-state quantity detecting section 210 inputs a signal from an angle sensor, a torque sensor and a speed sensor, and detects an EPS-state quantity. Concretely, the angle sensor detects a handle angle (an angle at an upper-side of a torsion bar) θh as an actual steering angle θr, the torque sensor detects the steering torque Tt, and the speed sensor detects the vehicle speed V. Further, the EPS-state quantity detecting section 210 calculates an actual steering angular velocity ωr by performing a differential calculation for the actual steering angle θr. The actual steering angle θr and the actual steering angular velocity ωr are inputted into the steering angle control section 300, the steering torque Tt is inputted into the switch judging and gradual-change gain generating section 220, the steering angle control section 300 and the assist control section 230, and the vehicle speed V is inputted into the steering angle control section 300 and the assist control section 230.

As well, it is possible to use a column angle (an angle at a lower-side of the torsion bar) as the actual steering angle θr, and also to use a rotational angle of the motor as the actual steering angle θr by including a motor angle sensor (a rotational angle sensor). Moreover, the actual steering angle θr and the vehicle speed V may be detected at the vehicle-side ECU 100, and may be sent to the EPS-side ECU 200. The actual steering angular velocity ωr maybe calculated by performing a difference calculation with respect to the rotational angle detected by the motor angle sensor and using a gear ratio, or maybe calculated by performing a difference calculation with respect to the actual steering angle θr. It is possible to insert a low pass filter (LPF) at the final stage of the EPS-state quantity detecting section 210 to reduce a high frequency noise, and in this case, it is possible to calculate the actual steering angular velocity ωr with a high pass filter (HPF) and a gain.

The switch judging and gradual-change gain generating section 220 performs a switch judging between the automatic steering and the manual steering based on the switch signal SW from the vehicle-side ECU 100 and the steering torque Tt, and determines gradual-change gains based on the judgment result. The switch judging and gradual-change gain generating section 220 obtains, as the gradual-change gains, a steering angle control output gradual-change gain Gaf1, a velocity control gradual-change gain Gfa2, a velocity command gradual-change gain Gfa3, a steering angle command gradual-change gain Gfa4, an assist control output gradual-change gain Gft1 and an assist map gradual-change gain Gft2. The steering angle control output gradual-change gain Gaf1 and the assist control output gradual-change gain Gft1 are inputted into the switching section 240, the velocity control gradual-change gain Gfa2, the velocity command gradual-change gain Gfa3 and the steering angle command gradual-change gain Gfa4 are inputted into the steering angle control section 300, and the assist map gradual-change gain Gft2 is inputted into the assist control section 230. The detail of the switch judging and gradual-change gain generating section 220 will be described later.

The steering angle control section 300 calculates a steering angle control current command value IrefP1 by using the steering angle command value θref, the actual steering angle θr, the actual steering angular velocity ωr, the steering torque Tt, the vehicle speed V from the vehicle-side ECU 100 as well as the gradual-change gains Gfa2, Gfa3 and Gfa4 in order to perform the steering angle control. The steering angle control current command value IrefP1 is inputted into the switching section 240.

As well, it is possible to calculate the actual steering angular velocity ωr not at the EPS-state quantity detecting section 210 but at steering angle control section 300. The detail of the steering angle control section 300 will be described later.

Figure 1:
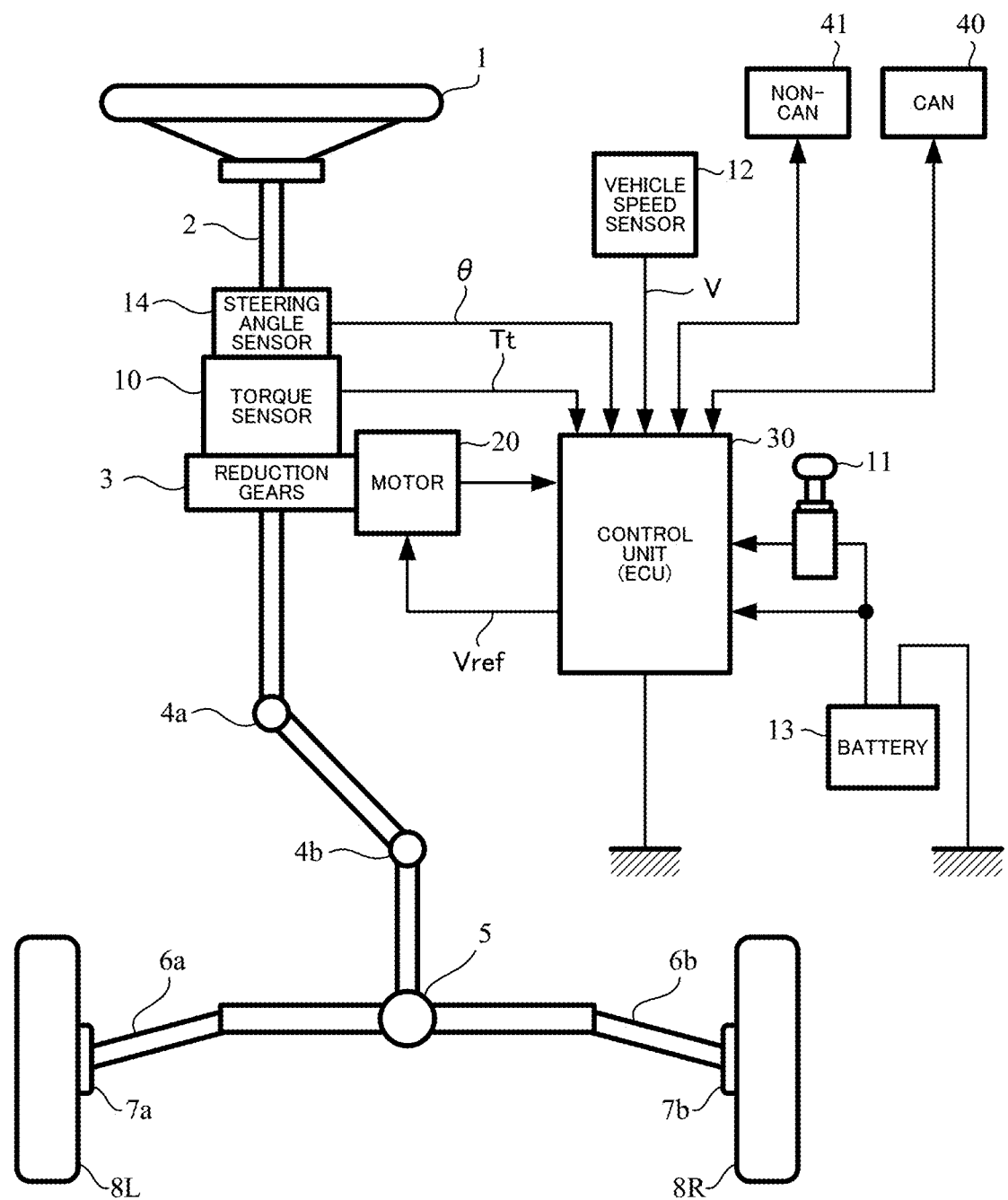
FIG. 1 is a configuration diagram illustrating a general outline of an electric power steering apparatus.
Figure 2:
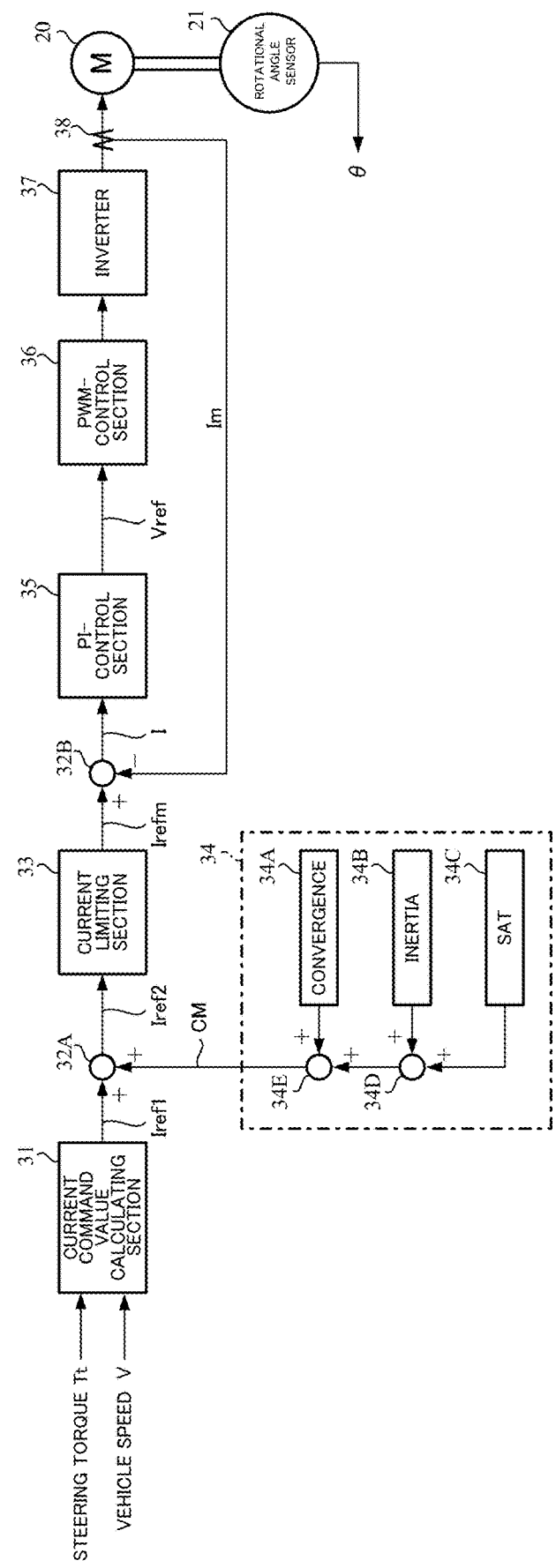
FIG. 2 is a block diagram showing a configuration example of a control unit (ECU) of the electric power steering apparatus.

The assist control section 230 comprises, for example, the current command value calculating section 31, the current limiting section 33, the compensation signal generating section 34 and then adding section 32A in a configuration example shown in FIG. 2 in order to perform the assist control, and calculates an assist control current command value IrefT1 equivalent to the current command value Irefm shown in FIG. 2 based on the steering torque Tt and the vehicle speed V and by using the assist map. However, the assist control section 230 is different from the configuration example shown in FIG. 2, inputs the assist map gradual-change gain Gft2 outputted from the switch judging and gradual-change gain generating section 220, multiplies an output (an assist map output current) from the current command value calculating section 31 with the assist map gradual-change gain Gft2, and inputs the multiplied result into the adding section 32A. The assist map used at the current command value calculating section 31 is a map that defines a characteristic of a current command value for the steering torque Tt, is vehicle speed-sensitive, and has a characteristic that the current command value decreases as the vehicle speed V increases. Moreover, the current limiting section 33 and/or the compensation signal generating section 34 may be removed.

The switching section 240 calculates a current command value Iref by using the steering angle control current command value IrefP1, the assist control current command value IrefT1 and the gradual-change gains Gaf1 and Gft1. The detail of the switching section 240 will be described later.

The current control and driving section 250 comprises, for example, the subtracting section 32B, the PI-control section 35, the PWM-control section 36 and the inverter 37 in the configuration example shown in FIG. 2, and drive-controls the motor by using the current command value Iref and the motor current Im detected by the motor current detector 38 and by the same operations as the configuration example shown in FIG. 2.

The plant 400 is a physical model of a control target that simulates a characteristic of the driver in the handle steering and a mechanical characteristic of the EPS and the vehicle, and has a driver steering transfer characteristic 410 and a mechanical transfer characteristic 420. A mechanical system operates based on a handle manual input torque Th caused by the steering of the driver and the motor current Im from the EPS-side ECU 200, and this causes a state information EV with respect to the vehicle and the EPS, so that the mechanical transfer characteristic 420 outputs the state information EV. The vehicle-state quantity detecting section 110 in the vehicle-side-ECU 100 and the EPS-state quantity detecting section 210 in the EPS-side ECU 200 detect the vehicle-state quantity Cv and the EPS-state quantity respectively from the state information EV. Since the handle manual input torque Th caused by the steering of the driver occurs depending on the handle angle θh included in the state information EV, the driver steering transfer characteristic 410 outputs the handle manual input torque Th.

Next, the switch judging and gradual-change gain generating section 220, the steering angle control section 300 and the switching section 240 in the EPS-side ECU 200 will be described in detail.

Figure 4:
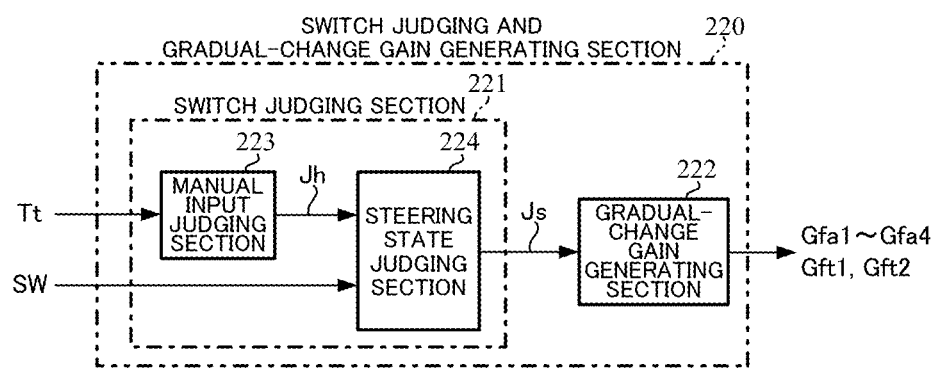
FIG. 4 is a block diagram showing a configuration example of a switch judging and gradual-change gain generating section.

FIG. 4 shows a configuration example of the switch judging and gradual-change gain generating section 220, the switch judging and gradual-change gain generating section 220 includes a switch judging section 221 and a gradual-change gain generating section 222, and the switch judging section 221 has a manual input judging section 223 and a steering state judging section 224.

Figure 5:
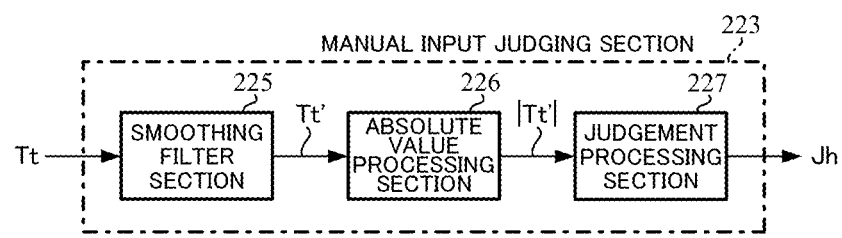
FIG. 5 is a block diagram showing a configuration example of a manual input judging section.

The manual input judging section 223 judges whether a manual input presents or not by using the steering torque Tt. A configuration example of the manual input judging section 223 is shown in FIG. 5, and the manual input judging section 223 includes a smoothing filter section 225, an absolute value processing section 226 and a judgment processing section 227. The smoothing filter section 225 has a smoothing filter, smooths the steering torque Tt with the smoothing filter, and outputs a steering torque Tt' obtained after the smoothing. The steering torque Tt' is inputted into the absolute value processing section 226, and the absolute value processing section 226 outputs an absolute value (an absolute value data) |Tt'| of the steering torque Tt'. The absolute value |Tt'| is inputted into the judgment processing section 227. The judgment processing section 227 compares a predetermined threshold Tth and the absolute value |Tt'|, judges that "presence of the manual input" when the absolute value |Tt'| is larger than or equal to the threshold Tth, judges that "absence of the manual input" when the absolute value |Tt'| is smaller than the threshold Tth, and outputs the judgment result as a manual input judgment signal Jh.

The steering state judging section 224 judges a steering state due to the switch signal SW from the vehicle-side ECU 100 and the manual input judgment signal Jh. When the switch signal SW indicates "the assist control mode" or the manual input judgment signal Jh indicates that "presence of the manual input", the steering state judging section 224 judges that the steering state is "the manual steering". Otherwise, when the switch signal SW indicates "the steering angle control mode" and the manual input judgment signal Jh indicates that "absence of the manual input", the steering state judging section 224 judges that the steering state is "the automatic steering". The judgment result is outputted as the steering state judgment signal Js.

As well, it is possible to judge the steering state with the manual input judgment signal Jh alone. That is, the steering state judging section 224 may judge that the steering state is "the manual steering" when the manual input judgment signal Jh indicates that "presence of the manual input", and may judge that the steering state is "the automatic steering" when the manual input judgment signal Jh indicates that "absence of the manual input".

The gradual-change gain generating section 222 determines the gradual-change gains based on the steering state judgment signal Js. The gradual-change gains take various values depending on the steering state, and the gradual-change gain generating section 222 judges the steering state based on the steering state judgment signal Js.

Figure 6:
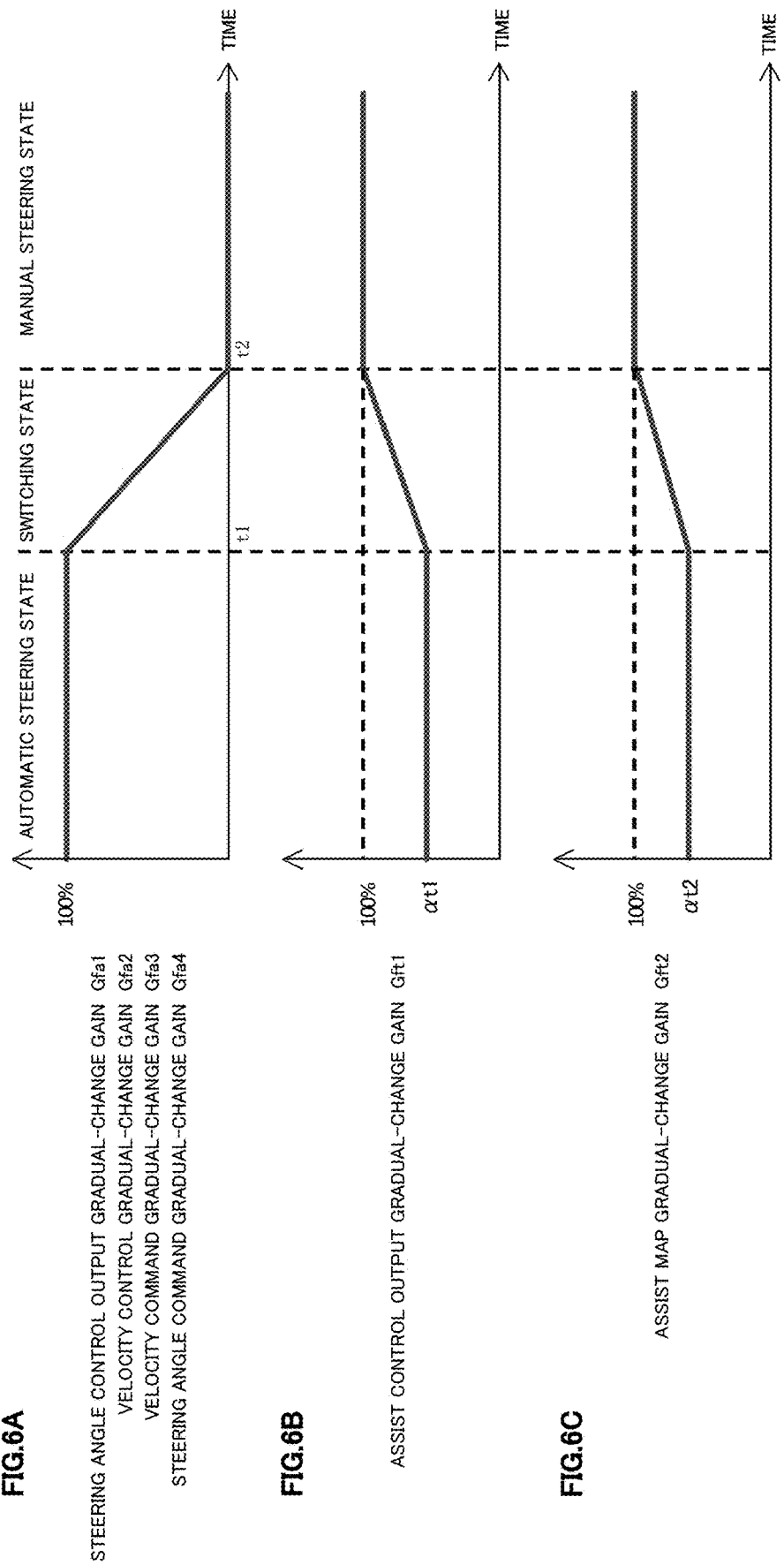
FIGS. 6A, 6B and 6C are graphs showing a changing example of gradual-change gains corresponding to a steering state.

The gradual-change gains Gaf1, Gaf2, Gaf3 and Gaf4 are "100%" in the automatic steering state, are "0%" in the manual steering state, and are gradually changed in the case of shifting from the automatic steering state to the manual steering and in the case of shifting from the manual steering to the automatic steering state. For example, in the case of shifting from the automatic steering state to the manual steering, the gradual-change gains Gaf1 to Gaf4 are changed as shown in FIG. 6A. That is, the gradual gains successively decrease from a time point t1 when the steering state judgment signal Js is changed from "the automatic steering" to "the manual steering", and become "0%" at a time point t2. On the contrary, in the case of shifting from the manual steering to the automatic steering state, the gradual-change gains successively increase from the time point when the steering state judgment signal Js is changed to "the automatic steering". In the case that the steering state judgment signal Js is changed during the decrease or the increase in the gradual-change gains (hereinafter this state of the decrease or the increase is referred to "a switching state"), the gradual-change gains turn to increase if decreasing, and turn to decrease if increasing.

As well, although the gradual-change gains are changed linearly in the switching state in FIG. 6A, in order to make the switching operation smooth, they may be changed like an S-shaped bend, and it is possible to use the gradual-change gains changed linearly through such an LPF as a primary LPF whose cutoff frequency is 2 [Hz]. Further, the gradual-change gains Gaf1 to Gaf4 do not need to similarly change in conjunction, and may change independently.

The assist control output gradual-change gain Gft1 is αt1 [%] (0≤αt1≤150) in the automatic steering state, is "100%" in the manual steering state, and is gradually changed in the switching state as with the gradual-change gains Gaf1 to Gaf4, as shown in FIG. 6B.

The assist map gradual-change gain Gft2 is αt2 [%] (0≤αt2≤150) in the automatic steering state, is "100%" in the manual steering state, and is gradually changed in the switching state as with the gradual-change gains Gaf1 to Gaf4, as shown in FIG. 6C.

Figure 7:
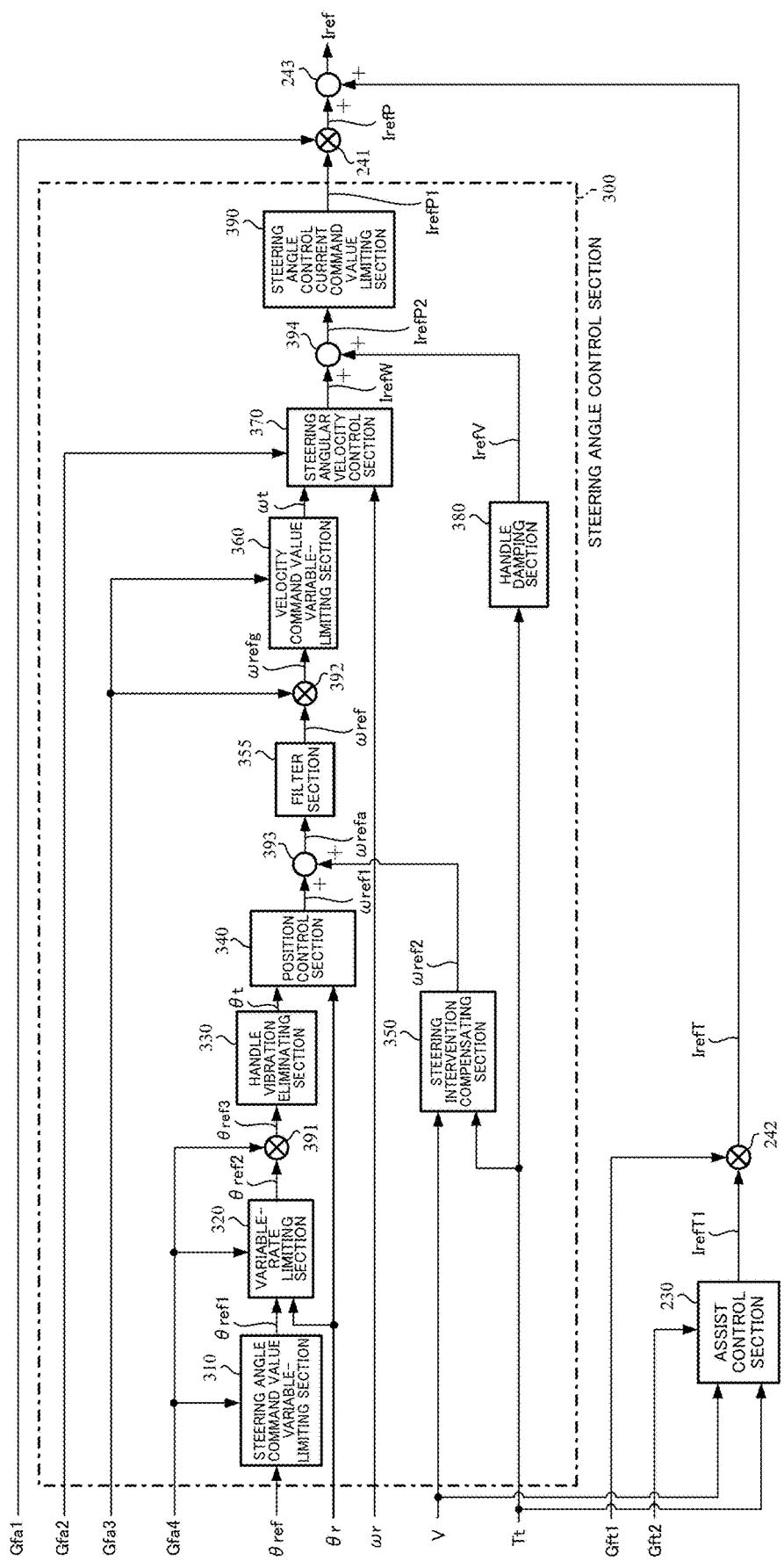
FIG. 7 is a block diagram showing a configuration example of a steering angle control section and a switching section.

A configuration example of the steering angle control section 300 and the switching section 240 is shown in FIG. 7. The steering angle control section 300 comprises a steering angle command value variable-limiting section 310, a variable-rate limiting section 320, a handle vibration eliminating section 330, a position control section 340, a steering intervention compensating section 350, a velocity command value variable-limiting section 360, a steering angular velocity control section 370, a handle damping section 380, a steering angle control current command value limiting section 390, multiplying sections 391 and 392 and adding sections 393 and 394, and the switching section 240 includes multiplying sections 241 and 242 and an adding section 243.

Figure 8:
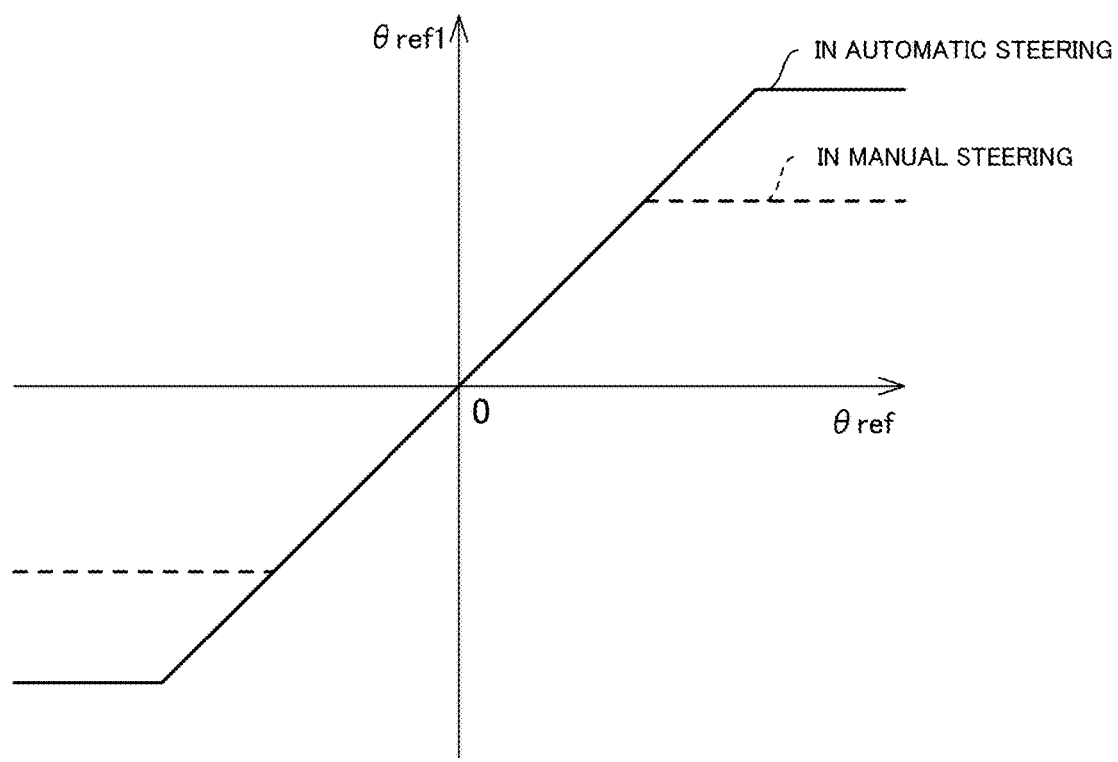
FIG. 8 is a characteristic diagram showing an example of a limit value in a steering angle command value variable-limiting section.

The steering angle command value variable-limiting section 310 in the steering angle control section 300 limits the steering angle command value θref which is received from the vehicle-side ECU 100 and is used for the automatic steering or the like by setting limit values (an upper limit value and a lower limit value) in order to prevent an abnormal value and an excessive value caused by a communication error or the like from being inputted into the steering control, and outputs the limited value as a steering angle command value θref1. The steering angle command value variable-limiting section 310 sets the limit values depending on the steering angle command gradual-change gain Gfa4 so as to set appropriate limit values in the automatic steering state and the manual steering state. For example, as shown in FIG. 8, the steering angle command value variable-limiting section 310 judges the case where the steering angle command gradual-change gain Gfa4 is "100%" to be the automatic steering state, and limits the steering angle command value θref with the limit value shown by the solid line. In addition, the steering angle command value variable-limiting section 310 judges the case where the steering angle command gradual-change gain Gfa4 is "0%" to be the manual steering state, and limits the steering angle command value θref with the limit value, whose absolute value is smaller than that in the automatic steering state, as shown by the broken line in FIG. 8. The steering angle command value variable-limiting section 310 judges the case where the steering angle command gradual-change gain Gfa4 is between "0%" and "100%" to be the switching state, and limits the steering angle command value θref with a value between the solid line and the broken line.

In the switching state, it is possible to limit the steering angle command value θref with the limit value of the automatic steering state shown by the solid line or the limit value of the manual steering state shown by the broken line. Moreover, a magnitude (an absolute value) of the upper limit value and a magnitude of the lower limit value may be different.

In order to avoid sharply changing a steering angle control current command value being a output of the steering angle control by a sudden change of the steering angle command value θref, the variable-rate limiting section 320 limits a change amount of the steering angle command value θref1 by setting a limit value, and outputs a steering angle command value θref2. For example, a difference between the previous steering angle command value (before one sampling) and the present steering angle command value θref1 is defined as the change amount, and in the case that the absolute value of the change amount is larger than a predetermined value (the limit value), the variable-rate limiting section 320 performs addition or subtraction for the steering angle command value θref1 so that the absolute value of the change amount becomes the limit value, and outputs the result as the steering angle command value θref2. On the contrary, in the case that the absolute value of the change amount is smaller than or equal to the limit value, the variable-rate limiting section 320 outputs the steering angle command value θref1 as the steering angle command value θref2 as it is.

In similar to the steering angle command value variable-limiting section 310, the variable-rate limiting section 320 sets the limit value depending on the steering angle command gradual-change gain Gfa4 so as to set an appropriate limit value in the automatic steering state and the manual steering state. The variable-rate limiting section 320 judges the steering state in accordance with the steering angle command gradual-change gain Gfa4. The variable-rate limiting section 320 sets the limit value to a predetermined limit value in the automatic steering state, and sets the limit value to zero in the manual steering state so that the steering angle command value θref2 is not changed and becomes constant. Although the variable-rate limiting section 320 uses an intermediate value between both limit values in the switching state, it may use the limit value of the automatic steering state or the limit value of the manual steering state. Moreover, it is possible to limit the change amount by setting an upper limit value and a lower limit value instead of setting the limit value for the absolute value of the change amount.

At the multiplying section 391, the steering angle command value θref2 is multiplied with the steering angle command gradual-change gain Gfa4, and the multiplied result is outputted as a steering angle command value θref3. This makes a target steering angle θt which is outputted from the handle vibration eliminating section 330 as described below in the switching state from the automatic steering state to the manual steering state, gradually approximate zero, and can make the steering angle control operate to a neutral state.

The handle vibration eliminating section 330 reduces a vibration frequency component included in the steering angle command value θref3. In the automatic steering, when the steering command is changed, a frequency component (about 10 [Hz]) exciting a vibration caused due to a springiness of the torsion bar and an inertia moment of the handle (the steering wheel), occurs in the steering angle command value θref3. The handle vibration eliminating section 330 reduces the handle vibration frequency component included in the steering angle command value θref3 by a filter processing using an LPF, a notch filter and so on or a phase delay compensation, and then outputs the target steering angle θt. As the filter, any filter may be used if it lowers a gain in a band of the handle vibration frequency and is possible to provide for the ECU. Providing the multiplying section 391 multiplying the steering angle command gradual-change gain Gfa4 in front of the handle vibration eliminating section 330, enables to reduce the handle vibration frequency component caused by multiplying the steering angle command gradual-change gain Gfa4. Besides, it is possible to omit the handle vibration eliminating section 330 in such a case that the handle vibration frequency component is minute.

The position control section 340 calculates a steering angular velocity command value (a basic steering angular velocity command value) ωref1 for making the actual steering angle θr approximate the target steering angle θt based on a deviation between the target steering angle θt and the actual steering angle θr with a proportional (P) control.

Figure 9:
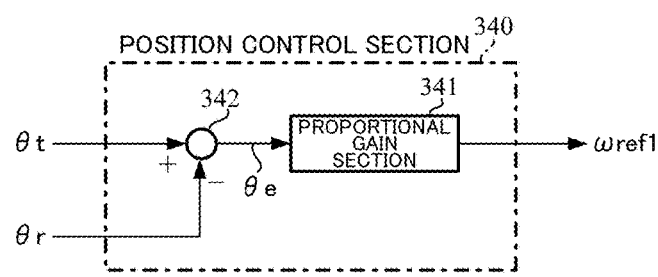
FIG. 9 is a block diagram showing a configuration example of a position control section.

A configuration example of the position control section 340 is shown in FIG. 9. The position control section 340 comprises a proportional gain section 341 and a subtracting section 342. A deviation θe (=θt−θr) between the target steering angle θt and the actual steering angle θr is obtained at the subtracting section 342, and the deviation θe is inputted into the proportional gain section 341. The proportional gain section 341 multiplies the deviation θe with a proportional gain Kpp, and calculates the steering angular velocity command value ωref1.

The steering intervention compensating section 350 calculates a steering angular velocity command value (a compensatory steering angular velocity command value) ωref2 for compensating the steering intervention corresponding to the steering torque Tt. A value obtained by adding the steering angular velocity command value ωref2 and the steering angular velocity command value ωref1 from the position control section 340 becomes a steering angular velocity command value ωref. The function of the steering intervention compensating section 350 enables to generate the steering angular velocity command value so as to mitigate an occurrence of the steering torque, and can realize the steering intervention during the automatic steering. Further, the steering intervention compensating section 350 can achieve an appropriate feeling by performing a compensation by using the steering intervention compensation map with the vehicle speed-sensitive and a phase-compensation.

Figure 10:
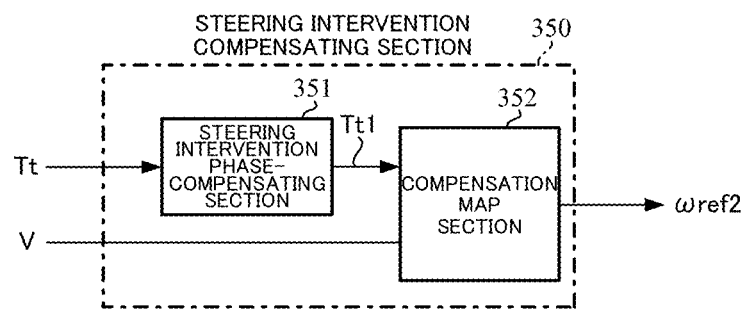
FIG. 10 is a block diagram showing a configuration example (the first embodiment) of a steering intervention compensating section.

A configuration example of the steering intervention compensating section 350 is shown in FIG. 10, and the steering intervention compensating section 350 includes a steering intervention phase-compensating section 351 and a compensation map section 352.

The steering intervention phase-compensating section 351 sets a phase lead compensation as the phase compensation, and converts the steering torque Tt into the steering torque Tt1. The steering intervention phase-compensating section 351 performs the phase lead compensation, for example, by using a primary filter where a cutoff frequency of a numerator is 1.0 [Hz] and a cutoff frequency of a denominator is 1.3 [Hz]. Thereby, it is possible to improve a feeling without resistance and a catching feeling in such a case of suddenly steering. As well, the steering intervention phase-compensating section 351 may be omitted in such a case of focusing on a cost.

Figure 11:
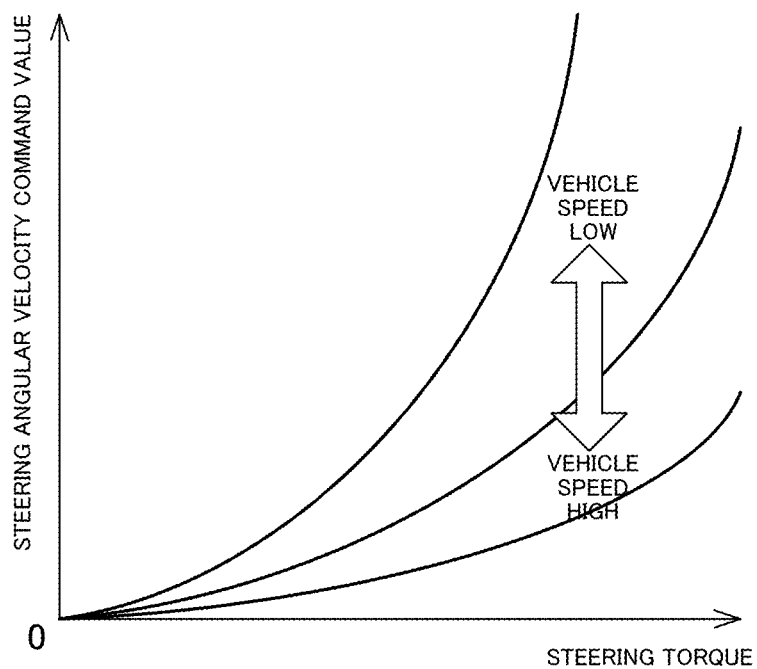
FIG. 11 is a characteristic diagram showing an example of a steering intervention compensating map.

The compensation map section 352 has the steering intervention compensation map and calculates the steering angular velocity command value ωref2 by using the steering intervention compensation map. Since the steering intervention compensation map is a map by which the characteristic of the steering angular velocity command value for the steering torque Tt1 is determined and its value changes depending on the vehicle speed V, the steering angular velocity command value ωref2 is calculated based on the steering torque Tt1 and the vehicle speed V. The steering intervention compensation map is, in advance, adjusted by a tuning. For example, as shown in FIG. 11, the steering angular velocity command value increases as the steering torque increases, and decreases as the vehicle speed increases. Thereby, it is possible to obtain a heavy feeling at a higher vehicle speed. The assist map used at the assist control section 230 also has a characteristic that the assist control current command value decreases as the vehicle speed increases. Accordingly, in the case that the steering intervention is performed by the driver at a high speed running, increases of the steering angular velocity command value and the assist control current command value are suppressed, the steering does not become sudden, and the safe steering is enabled.

As well, the steering intervention phase-compensating section 351 may be disposed at a rear stage of the compensation map section 352.

The steering angular velocity command value ωref1 outputted from the position control section 340 and the steering angular velocity command value ωref2 outputted from the steering intervention compensating section 350 are added at the adding section 393, and the added result is outputted as the steering angular velocity command value ωrefa.

The filter section 355 has an FF filter, and converts the steering angular velocity command value ωrefa into the steering angular velocity command value (the extended steering angular velocity command value) ωref with the FF filter. By using the FF filter, it is possible to extend a band, where the actual steering angular velocity ωr is controlled with respect to the steering angular velocity command value ωrefa, to a high frequency side, and further to improve the responsiveness of the velocity control operation as an inner loop of the steering angle control. If the responsiveness of the velocity control is improved, since it is possible to largely adjust, without overshooting, gains of the position control (the steering angle control) and the steering intervention compensation which are outside the velocity control, it is possible to improve the responsiveness in the steering angle control and the steering intervention as a result. The filter section 355 uses, for example, a filter which performs the phase lead compensation and where a cutoff frequency of a numerator is 3.0 [Hz] and a cutoff frequency of a denominator is 5.0 [Hz] as the FF filter.

The steering angular velocity command value ωref is multiplied with the velocity command gradual-change gain Gfa3 at the multiplying section 392, and the multiplied result is outputted as a steering angular velocity command value ωrefg. The velocity command gradual-change gain Gfa3 is used in order to achieve the smooth switching in the case of switching from the manual steering state to the automatic steering state. Moreover, the velocity command gradual-change gain Gfa3 is changed in synchronous with the steering angle control output gradual-change gain Gaf1 by which the steering angle control current command value IrefP1 is multiplied (the synchronization may not be perfect).

Figure 12:
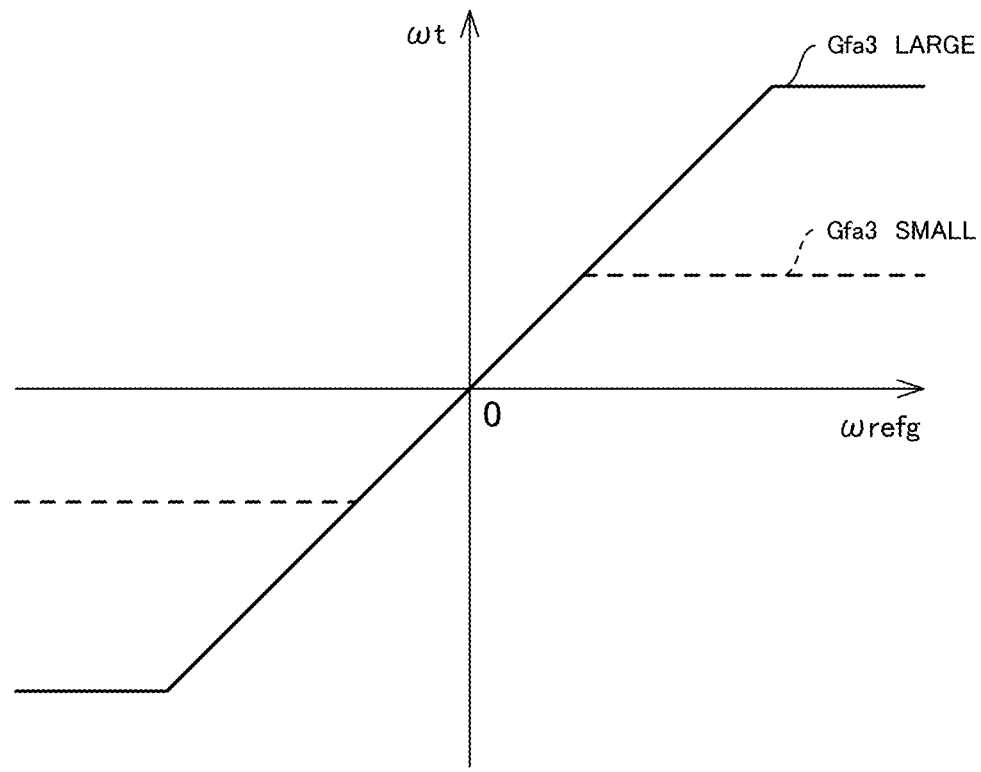
FIG. 12 is a characteristic diagram showing an example of a limit value in a velocity command value variable-limiting section.

The velocity command value variable-limiting section 360 limits the steering angular velocity command value ωrefg by setting limit values (an upper limit value and a lower limit value), and outputs a target steering angular velocity ωt. The limit values are set depending on the velocity command gradual-change gain Gfa3. For example, when the velocity command gradual-change gain Gfa3 is smaller than a predetermined threshold, magnitudes (absolute values) of the limit values are small values as shown by the broken line in FIG. 12, and when it is larger than or equal to the predetermined threshold, the magnitudes of the limit values are increased to the values shown by the solid line.

As well, it is possible that the predetermined threshold is set to any value of the velocity command gradual-change gain Gfa3 in the switching state, the magnitudes of the limit values are fixed at the small values shown by the broken line when the velocity command gradual-change gain Gfa3 is smaller than the predetermined threshold, and the magnitudes of the limit values are gradually increased to the values shown by the solid line. The magnitude of the upper limit value and the magnitude of the lower limit value may be different.

The steering angular velocity control section 370 inputs the target steering angular velocity ωt, the actual steering angular velocity ωr and the velocity control gradual-change gain Gfa2, and calculates a steering angle control current command value IrefW by using an I-P control (a proportional preceding-type PI control) so that the actual steering angular velocity ωr follows the target steering angular velocity ωt.

Figure 13:
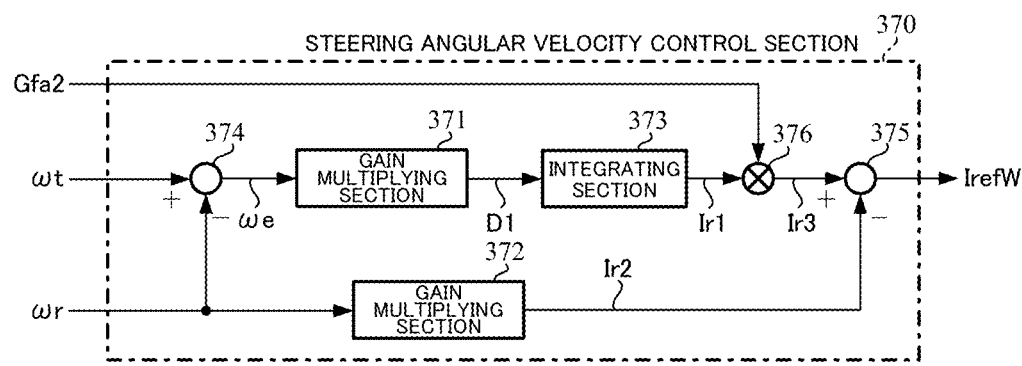
FIG. 13 is a block diagram showing a configuration example (the first embodiment) of a steering angular velocity control section.

A configuration example of the steering angular velocity control section 370 is shown in FIG. 13. The steering angular velocity control section 370 includes gain multiplying sections 371 and 372, an integrating section 373, subtracting sections 374 and 375, and a multiplying section 376.

The gain multiplying section 371 multiplies a deviation ωe (=ωt−ωr) between the target steering angular velocity ωt and the actual steering angular velocity ωr, which is calculated at the subtracting section 374, with a gain Kvi, and outputs an operation amount D1. The integrating section 373 integrates the operation amount D1, and calculates a control amount Ir1. At the multiplying section 376, the control amount Ir1 is multiplied with the velocity control gradual-change gain Gfa2, and the multiplied result is outputted as a control amount Ir3. The multiplication of the velocity control gradual-change gain Gfa2 is performed in order to achieve the smooth switching between the manual steering state and the automatic steering state, and this can relieve an influence of accumulation of an integral value in the steering angular velocity control at the time of the switching. The gain multiplying section 372 multiplies the actual steering angular velocity ωr with a gain Kvp, and outputs a control amount Ir2. At the subtracting section 375, a deviation (Ir3-Ir2) between the control amounts Ir3 and Ir2 is calculated, and the subtracted result is outputted as the steering angle control current command value IrefW. Moreover, as the integral of the integrating section 373, any method can be used if it is an integral method possible to achieve in the implementation, and the integrating section 373 can be constituted of a primary delay transfer function and a gain in the case of using pseudo-integral. Further, the velocity control gradual-change gain Gfa2 may be changed in synchronous with the steering angle control output gradual-change gain Gaf1.

As well, although the steering angular velocity control section 370 uses the I-P control, a conventional control method generally used may be used if it can make the actual steering angular velocity follow the target steering angular velocity. For example, it is possible to use a PI-control, a two-degree of freedom PI-control, a model reference control, a model matching control, a robust control, a control method that estimates a disturbance and combines a compensating means for counteracting a disturbance component with a part of it, and so on.

The handle damping section 380 damps a handle vibration based on the steering torque Tt being a torsion bar torque signal. Although the handle vibration eliminating section 330 also has an effect on the handle vibration in the automatic steering, the handle damping section 380 can further improve the effect. The handle damping section 380 damps the handle vibration by the gain and the phase compensation, and outputs a steering angle control current command value IrefV operating to eliminate the torsion of the torsion bar. Further, the handle damping section 380 operates to reduce a torsion angle, and has also an effect of reducing the catching uncomfortable feeling occurring when the manual input of the driver intervenes.

Figure 14:
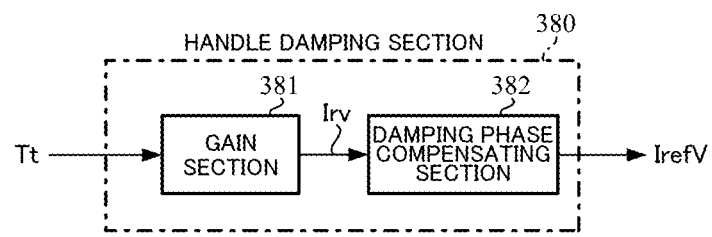
FIG. 14 is a block diagram showing a configuration example of a handle damping section.

A configuration example of the handle damping section 380 is shown in FIG. 14. The handle damping section 380 includes a gain section 381 and a damping phase compensating section 382. The gain section 381 multiplies the steering torque Tt with a gain Kv, and outputs a control amount Irv. The damping phase compensating section 382 is constituted of, for example, a primary filter, and converts the control amount Irv into the steering angle control current command value IrefV. The damping phase compensating section 382 may be constituted of a phase compensation filter whose order is larger than or equal to two instead of the primary filter.

At the adding section 394, the steering angle control current command value IrefW outputted from the steering angular velocity control section 370 and the steering angle control current command value IrefV outputted from the handle damping section 380, are added, and the added result is outputted as a steering angle control current command value IrefP2.

Figure 15:
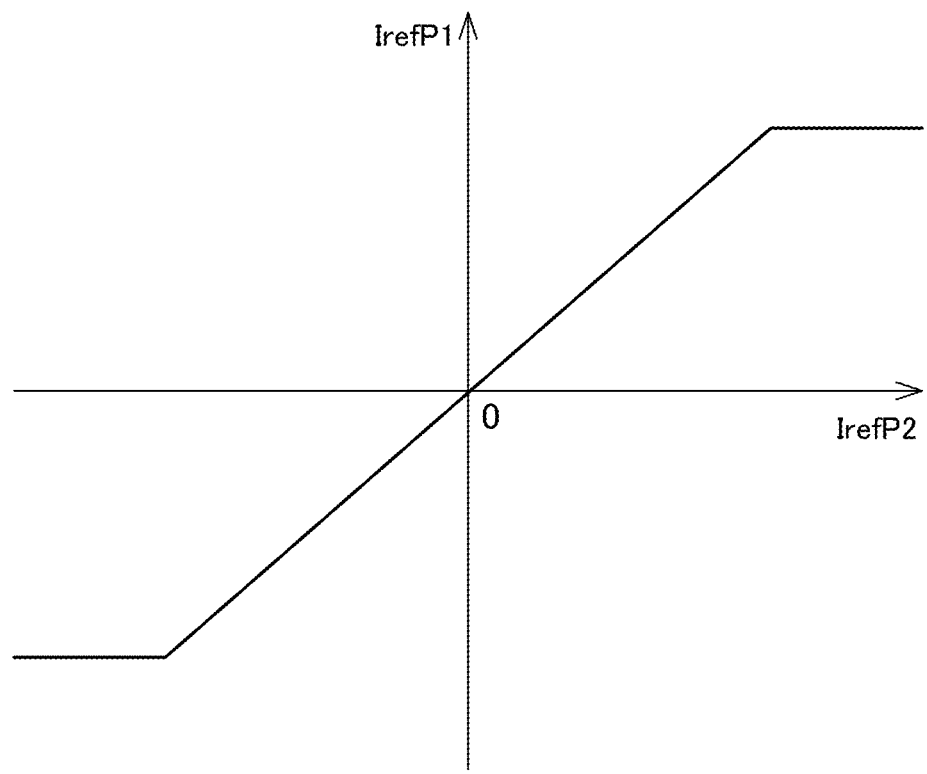
FIG. 15 is characteristic diagram showing an example of a limit value in a steering angle control current command value limiting section.
Figure 16:
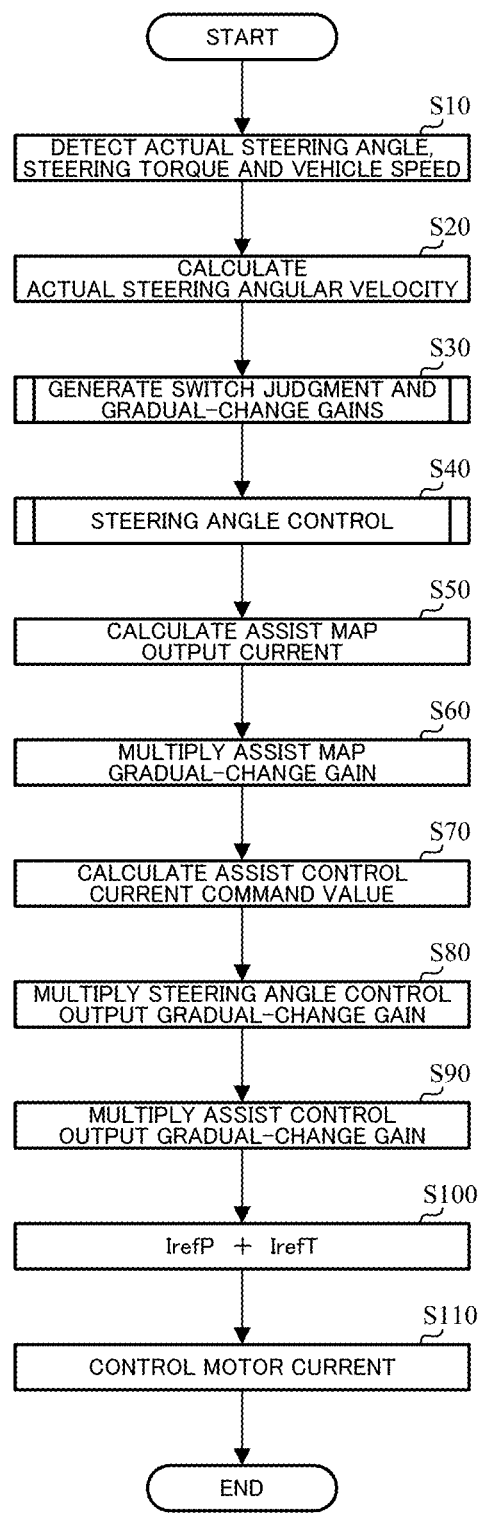
FIG. 16 is a flowchart showing an operating example of an EPS-side ECU.

The steering angle control current command value limiting section 390 limits the steering angle control current command value IrefP2 by setting limit values (an upper limit value and a lower limit value) in order to prevent an excessive output, and outputs the steering angle control current command value IrefP1. For example, the steering angle control current command value limiting section 390 limits the steering angle control current command value IrefP2 by setting the upper limit value and the lower limit value as shown in FIG. 15. Besides, a magnitude (an absolute value) of the upper limit value and a magnitude of the lower limit value may be different.

The switching section 240 comprises the multiplying sections 241 and 242, and the adding section 243.

At the multiplying section 241 of the switching section 240, the steering angle control current command value IrefP1 outputted from the steering angle control section 300 is multiplied with the steering angle control output gradual-change gain Gaf1 outputted from the switch judging and gradual-change gain generating section 220, and the multiplied result is outputted as a steering angle control current command value IrefP. The steering angle control output gradual-change gain Gaf1 is used in order to smoothly perform the switching operation between the manual steering state and the automatic steering state and to achieve the comfortable feeling for the driver, the safety and so on. At the multiplying section 242, the assist control current command value IrefT1 outputted from the assist control section 230 is multiplied with the assist control output gradual-change gain Gft1, and the multiplied result is outputted as an assist control current command value IrefT. The assist control output gradual-change gain Gft1 is used in order to smoothly perform the switching operation between the manual steering state and the automatic steering state and to achieve the steering intervention by the driver in the automatic steering. At the adding section 243, the steering angle control current command value IrefP and the assist control current command value IrefT are added, and the added result is outputted as the current command value Iref.

The assist map gradual-change gain Gft2 used in the above assist control section 230 is also used for the same purpose as the assist control output gradual-change gain Gft1. In the automatic steering state, by setting the assist control output gradual-change gain Gft1 to "αt1" and the assist map gradual-change gain Gft2 to "αt2" as shown in FIGS. 6B and 6C and adjusting the values "αt1" and "αt2", it is possible to improve the safety of the system and the suppression of the vibration occurrence. Further, if it is possible to maintain the safety of the system in the automatic steering state, it is capable of setting the value αt1 to "0%" and the value αt2 to "100%" simply. In this case, since the value αt1 is "0%", the assist control current command value IrefT becomes a zero command, and this means to achieve the steering intervention even without the assist control.

In such a configuration, an operating example of the EPS-side ECU 200 will be described with reference to flowcharts shown in FIGS. 16 to 19.

When the operation is started, the EPS-state quantity detecting section 210 detects the actual steering angle θr, the steering torque Tt and the vehicle speed V (Step S10), outputs the actual steering angle θr to the steering angle control section 300, outputs the steering torque Tt to the switch judging and gradual-change gain generating section 220, the steering angle control section 300 and the assist control section 230, and outputs the vehicle speed V to the steering angle control section 300 and the assist control section 230. Further, the EPS-state quantity detecting section 210 calculates the actual steering angular velocity ωr from the actual steering angle θr (Step S20), and outputs the actual steering angular velocity ωr to the steering angle control section 300.

The switch judging and gradual-change gain generating section 220 inputting the steering torque Tt judges the switching between the automatic steering and the manual steering with reference to the presence/absence of the input of the switch signal SW outputted from the vehicle-side ECU 100, and determines the gradual-change gains based on the judgment result (Step S30). The switch judging and gradual-change gain generating section 220 outputs the gradual-change gains Gfa2, Gfa3 and Gfa4 to the steering angle control section 300, outputs the gradual-change gain Gft2 to the assist control section 230, and outputs the gradual-change gains Gaf1 and the Gft1 to the switching section 240. A detailed operation of the switch judging and gradual-change gain generating section 220 will be described later.

The steering angle control section 300 inputs the steering angle command value θref outputted from the vehicle-side ECU 100, the actual steering angle θr, the actual steering angular velocity ωr, the steering torque Tt and the vehicle speed which are outputted from the EPS-state quantity detecting section 210, and the gradual-change gains Gfa2, Gfa3 and Gfa4 outputted from the switch judging and gradual-change gain generating section 220, calculates the steering angle control current command value IrefP1 by using them (Step S40), and outputs the steering angle control current command value IrefP1 to the switching section 240. A detailed operation of the steering angle control section 300 will be described later.

The assist control section 230 inputs the steering torque Tt, the vehicle speed V and the assist map gradual-change gain Gft2, and calculates the assist map output current (the current value) by the same operation as the current command value calculating section 31 shown in FIG. 2 (Step S50). The assist control section 230 multiplies the assist map output current with the assist map gradual-change gain Gft2 (Step S60), performs the same operations as the adding section 32A, the current limiting section 33 and the compensation signal generating section 34 which are shown in FIG. 2 to the multiplied result, calculates the assist control current command value IrefT1 (Step S70), and outputs the assist control current command value IrefT1 to the switching section 240.

The switching section 240 multiplies the inputted steering angle control current command value IrefP1 with the steering angle control output gradual-change gain Gaf1 at the multiplying section 241 (Step S80), and outputs the steering angle control current command value IrefP being the multiplied result to the adding section 243. Similarly, the switching section 240 multiplies the inputted assist control current command value IrefT1 with the assist control output gradual-change gain Gft1 at the multiplying section 242 (Step S90), and outputs the assist control current command value IrefT being the multiplied result to the adding section 243. The adding section 243 adds the steering angle control current command value IrefP and the assist control current command value IrefT (Step S100), and outputs the current command value Iref being the added result to the current control and driving section 250.

By using the current command value Iref and the motor current Im detected by the motor current detector 38, the current control and driving section 250 performs the control so that the motor current Im follows the current command value Iref by the same operations as the subtracting section 32B, the PI-control section 35, the PWM-control section 36 and the inverter 37 which are shown in FIG. 2 (Step S110), and drive-controls the motor.

Figure 17:
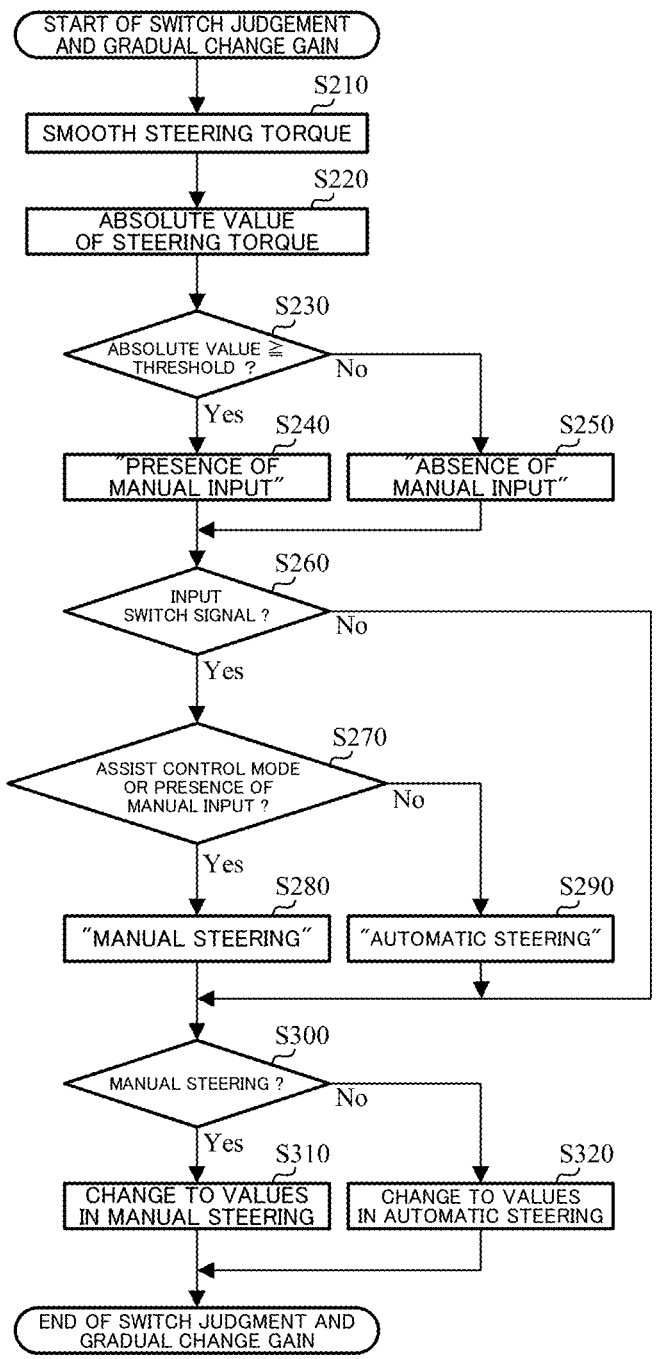
FIG. 17 is a flowchart showing an operating example of the switch judging and gradual-change gain generating section.

The detail of the operating example of the switch judging and gradual-change gain generating section 220 will be described with reference to a flowchart shown in FIG. 17. Here, "the manual steering" is set on the steering state judgment signal Js as an initial value in the steering state judging section 224.

The inputted steering torque Tt is inputted into the manual input judging section 223 in the switch judging section 221. The manual input judging section 223 smooths the steering torque Tt at the smoothing filter section 225 (Step S210), and obtains the absolute value |Tt'| of the smoothed steering torque Tt' the absolute value processing section 226 (Step S220). The absolute value |Tt'| is inputted into the judgment processing section 227. The judgment processing section 227 judges that "presence of the manual input" (Step S240) when the absolute value |Tt'| is larger than or equal to the threshold Tth (Step S230), and judges that "absence of the manual input" (Step S250) when the absolute value |Tt'| is smaller than the threshold Tth (Step S230). The judgment processing section 227 outputs the manual input judgment signal Jh being the judgment result to the steering state judging section 224.

The steering state judging section 224 confirms whether the switch signal SW is inputted or not (Step S260). In the case of inputting the switch signal SW, the steering state judging section 224 updates the steering state judgment signal Js to "the manual steering" (Step S280) when the switch signal SW indicates "the assist control mode" or the manual input judgment signal Jh indicates that "presence of the manual input" (Step S270), otherwise (Step S270), the steering state judging section 224 updates the steering state judgment signal Js to "the automatic steering" (Step S290). In the case of not inputting the switch signal SW, the steering state judgment signal Js is left as it is. The steering state judgment signal Js is inputted into the gradual-change gain generating section 222.

The gradual-change gain generating section 222 confirms the value of the steering state judgment signal Js (Step S300). When the steering state judgment signal Js is "the manual steering", the gradual-change gain generating section 222 changes the respective gradual-change gains (Gaf1 to Gfa4, Gft1 and Gft2) to the values in the manual steering state ("0%" for the gradual-change gains Gaf1 to Gfa4, and "100%" for the gradual-change gains Gft1 and Gft2) (Step S310). When the steering state judgment signal Js is "the automatic steering", the gradual-change gain generating section 222 changes the respective gradual-change gains to the values in the automatic steering state ("100%" for the gradual-change gains Gaf1 to Gfa4, "αt1" for the gradual-change gain Gft1, and "αt2" for the gradual-change gain Gft2) (Step S320).

The detail of the operating example of the steering angle control section 300 will be described with reference to flowcharts shown in FIGS. 18 and 19.

The steering angle command value variable-limiting section 310 confirms the value of the inputted steering angle command gradual-change gain Gfa4 (Step S410). The steering angle command value variable-limiting section 310 sets the limit values to the limit values "in the manual steering maneuver" shown in FIG. 8 (Step S420) when the gradual-change gain Gfa4 is "0%", sets the limit values to the limit values "in the automatic steering maneuver" shown in FIG. 8 (Step S430) when the gradual-change gain Gfa4 is "100%", and sets the limit values to intermediate values (Step S440) when the VGfa4 is between "0%" and "100%". The steering angle command value variable-limiting section 310 limits the steering angle command value θref inputted from the vehicle-side ECU 100 by using the set limit values (Step S450), and outputs the steering angle command value θref1.

The steering angle command value θref1 is inputted into the variable-rate limiting section 320 with the steering angle command gradual-change gain Gfa4 and the actual steering angle θr. The variable-rate limiting section 320 confirms the value of the steering angle command gradual-change gain Gfa4 (Step S460). When the steering angle command gradual-change gain Gfa4 is "0%", the variable-rate limiting section 320 sets the limit value to zero (Step S470), and sets the value of the stored previous steering angle command value θref1 to the value of the actual steering angle θr (Step S471). Since a value at the time of terminating the previous steering control remains at the time of starting the steering control where the gradual-change gain Gfa4 becomes larger than "0%" and a handle may suddenly move by a sudden change if using its value as it is, the above Step S471 is a step for suppressing the sudden change of the steering angle command value by starting in a state of matching the steering angle command value θref1 with the actual steering angle θr. The variable-rate limiting section 320 sets the limit value to the predetermined value (Step S480) when the gradual-change gain Gfa4 is "100%", and sets the limit value to the intermediate value (Step S490) when the gradual-change gain Gfa4 is between "0%" and "100%".

Then, the variable-rate limiting section 320 calculates the difference (the change amount) between the steering angle command value θref1 and the previous steering angle command value θref1 (Step S500). When the absolute value of the change amount is larger than the limit value (Step S510), the variable-rate limiting section 320 increases or decreases the steering angle command value θref1 so that the absolute value of the change amount becomes the limit value (Step S520), and outputs the result as the steering angle command value θref2 (Step S530). On the contrary, when the absolute value of the change amount is smaller than or equal to the limit value (Step S510), the variable-rate limiting section 320 outputs the steering angle command value θref1 as the steering angle command value θref2 (Step S530).

The steering angle command value θref2 is multiplied with the steering angle command gradual-change gain Gfa4 at the multiplying section 391 (Step S540), and the multiplied result is outputted as the steering angle command value θref3. The steering angle command value θref3 is inputted into the handle vibration eliminating section 330.

The handle vibration eliminating section 330 reduces the vibration frequency component for the steering angle command value θref3 (Step S550), and outputs the reduced result as the target steering angle θt to the position control section 340.

The target steering angle θt is addition-inputted into the subtracting section 342 in the position control section 340. The actual steering angle θr has been subtraction-inputted into the subtracting section 342, and the deviation ee between the target steering angle θt and the actual steering angle θr is obtained at the subtracting section 342 (Step S560). The deviation θe is inputted into the proportional gain section 341. The proportional gain section 341 multiplies the deviation θe with the proportional gain Kpp, and calculates the steering angular velocity command value ωref1 (Step S570). The steering angular velocity command value ωref1 is inputted into the adding section 393.

Meanwhile, the steering intervention compensating section 350 inputs the vehicle speed V and the steering torque Tt, the vehicle speed V is inputted into the compensation map section 352 and the steering torque Tt is inputted into the steering intervention phase-compensating section 351. The steering intervention phase-compensating section 351 converts the steering torque Tt into the steering torque Tt1 by the phase compensation (Step S580). The steering torque Tt1 and the vehicle speed V are inputted into the compensation map section 352. The compensation map section 352 calculates the steering angular velocity command value ωref2 to the steering torque Tt1 by using a steering intervention compensating map determined from the vehicle speed V based on the characteristic shown in FIG. 11 (Step S590). The steering angular velocity command value ωref2 is inputted into the adding section 393.

The steering angular velocity command values ωref1 and ωref2 inputted into the adding section 393 are added (Step S600), and the added result is outputted as the steering angular velocity command value ωrefa to the filter section 355.

The filter section 355 converts the steering angular velocity command value ωrefa into the steering angular velocity command value ωref by using the FF filter (Step S610).

The steering angular velocity command value ωref is multiplied with the velocity command gradual-change gain Gfa3 at the multiplying section 392 (Step S620), and the multiplied result is inputted as the steering angular velocity command value ωrefg into the velocity command value variable-limiting section 360.

The velocity command value variable-limiting section 360 inputs the velocity command gradual-change gain Gfa3 with the steering angular velocity command values ωrefg, and confirms the value of the velocity command gradual-change gain Gfa3 (Step S630). The velocity command value variable-limiting section 360 sets the limit values to the limit values shown by "Gfa3 SMALL" in FIG. 12 (Step S640) when the gradual-change gain Gfa3 is smaller than the predetermined threshold, and sets the limit values to the limit values shown by "Gfa3 LARGE" (Step S650) when the gradual-change gain Gfa3 is larger than or equal to the predetermined threshold. The velocity command value variable-limiting section 360 limits the steering angular velocity command values ωrefg by using the set limit values (Step S660), and outputs the target steering angular velocity wt. The target steering angular velocity ωt is inputted into the steering angular velocity control section 370.

The steering angular velocity control section 370 inputs the actual steering angular velocity ωr and the velocity control gradual-change gain Gfa2 with the target steering angular velocity ωt. The target steering angular velocity ωt is addition-inputted into the subtracting section 374, the actual steering angular velocity ωr is subtraction-inputted into the subtracting section 374, and the deviation ωe between the target steering angular velocity ωt and the actual steering angular velocity ωr is inputted into the gain multiplying section 371 (Step S670). The gain multiplying section 371 multiplies the deviation ωe with the gain Kvi (Step S 680), and outputs the operation amount D1. The operation amount D1 is inputted into the integrating section 373. The integrating section 373 calculates the control amount Ir1 by integrating the operation amount D1 (Step S690), and outputs the control amount Ir1 to the multiplying section 376. The multiplying section 376 multiplies the control amount Ir1 with the velocity control gradual-change gain Gfa2 (Step S700), and outputs the control amount Ir3. The control amount Ir3 is addition-inputted into the subtracting section 375. The actual steering angular velocity ωr is inputted also into the gain multiplying section 372. The gain multiplying section 372 multiplies the actual steering angular velocity ωr with the gain Kvp (Step S710), and outputs the control amount Ir2. The control amount Ir2 is subtraction-inputted into the subtracting section 375. At the subtracting section 375, the deviation between the control amounts Ir3 and Ir2 is calculated (Step S720), and is outputted as the steering angle control current command value IrefW to the adding section 394.

The steering torque Tt is inputted also into the handle damping section 380. In the handle damping section 380, the gain section 381 multiplies the inputted steering torque Tt with the gain Kv (Step S730), and outputs the control amount Irv. The control amount Irv is phase-compensated at the damping phase compensating section 382 (Step S740), and the phase-compensated result is outputted as the steering angle control current command value IrefV. The steering angle control current command value IrefV is outputted to the adding section 394.

The steering angle control current command values IrefW and IrefV inputted into the adding section 394 are added (Step S750), and the added result is inputted as the steering angle control current command value IrefP2 into the steering angle control current command value limiting section 390.

The steering angle control current command value limiting section 390 limits the steering angle control current command value IrefP2 by using the limit values of the characteristic shown in FIG. 15, and outputs the steering angle control current command value IrefP1 (Step S760).

As well, the order of the operation of the steering angle control section 300 and the operation of the assist control section 230 may be reversed, or the operations may be performed in parallel. In the operation of the steering angle control section 300, the order of the operation to the calculation of the steering angular velocity command value ωref1 and the operation to the calculation of the steering angular velocity command value ωref2, which are inputted into the adding section 393, the order of the operation to the calculation of the steering angle control current command value IrefW and the operation to the calculation of the steering angle control current command value IrefV, which are inputted into the adding section 394, and so on, may be reversed respectively, or both operations may be performed in parallel respectively.

Effects of the present embodiment will be described based on results of simulations.

In the simulations, a vehicle motion model and a steering model of a driver are set as a plant model of the plant 400. It is possible to use a model shown in, for example, "Motion and Control of an Automobile", Masato Abe, Tokyo Denki University, Tokyo Denki University Press, published on Sep. 20, 2009, second impression of the first edition, chapter 3 (pages 49-105), chapter 4 (pages 107-130) and chapter 5 (pages 131-147), as the vehicle motion model, and use a model shown in, for example, "A Study with respect to an Estimation of Steering Feeling of a Vehicle considering a Musculoskeletal Characteristic of an Arm", Daisuke Yokoi, master's thesis, Master's Programs, Mechanical Engineering, Graduate School of Engineering, Mie University, received on Feb. 6, 2007, chapter 2 (pages 3-5) and chapter 3 (pages 6-9) (Reference Document) as the steering model. It is possible to use another model without limited to the above models.

Figure 20:
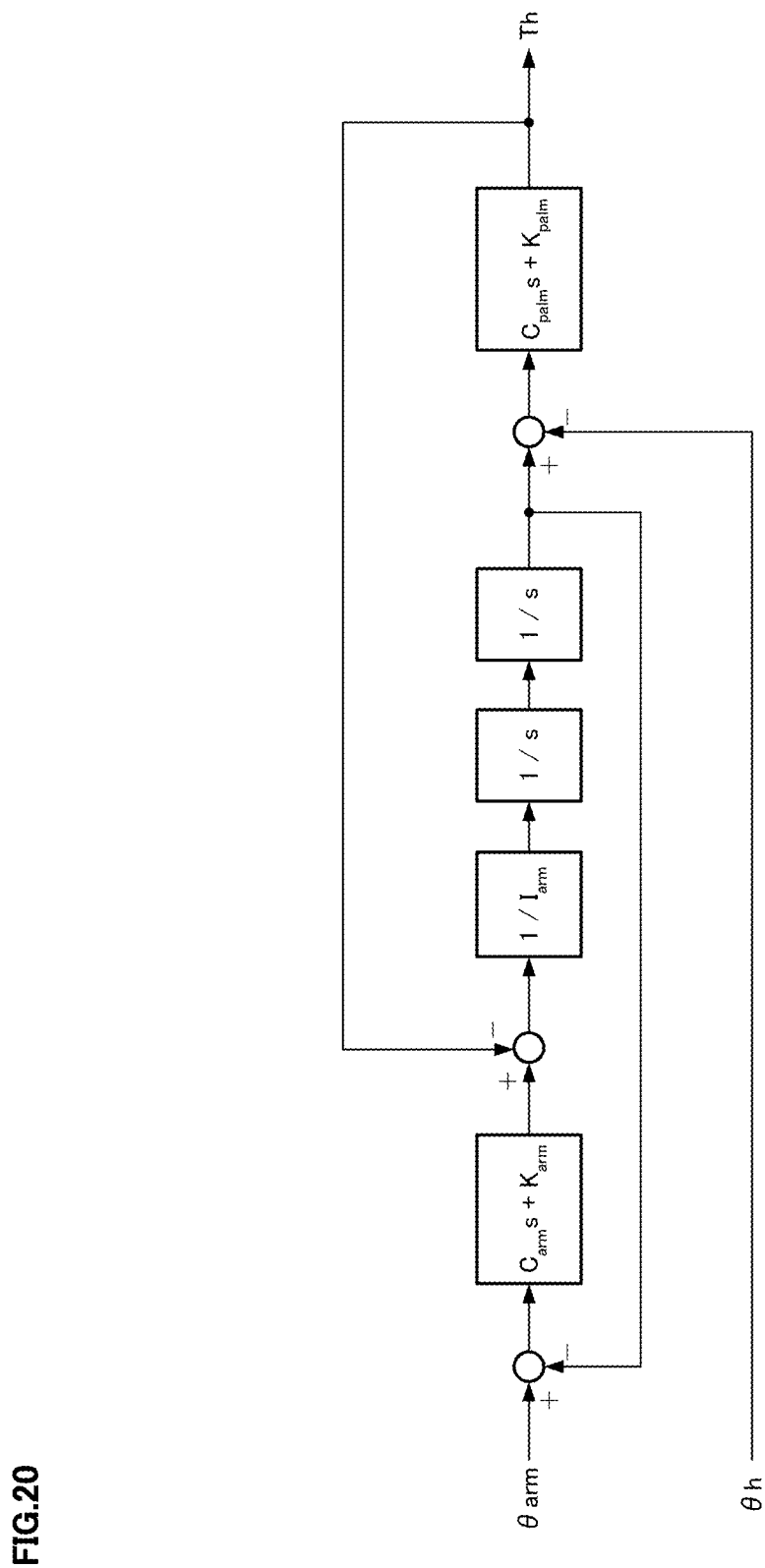
FIG. 20 is a block diagram showing an example of a steering model of a driver used in simulations.

The steering model used in the present simulation is shown in FIG. 20 as a reference. In FIG. 20, "$C_{arm}$" and "$C_{palm}$" denote viscosity coefficients, "$K_{arm}$" and "$K_{palm}$" denote spring constants, and "$I_{arm}$" denotes an inertia moment of an arm. The handle angle θh is inputted from a mechanical model (a mechanical transfer characteristic) to the steering model (a steering transfer characteristic of a driver), and the handle manual input torque Th is outputted from the steering model to the mechanical model. Hereinafter, a target angle described in Reference Document is referred to a driver's target angle (a steering target angle) θarm. In addition, the model shown in Reference Document adds a mass system of the arm to a column inertia moment, however, by defining a force applied from a palm to a handle as the handle manual input torque Th, no hindrance occurs even if performing a simulation assuming that the spring constant $K_{palm}$ and the viscosity coefficient $C_{palm}$ which operate between the angle of the palm and the handle angle θh are large enough, and the present simulation is performed in this way. It is also assumed that followability of the motor current to the current command value is fast enough, an influence by operation of the current control and driving section 250 is slight, and the current command value is equal to the motor current. Furthermore, the vehicle speed is assumed constant.

First, an effect due to the steering intervention compensation will be described.

Figure 21:
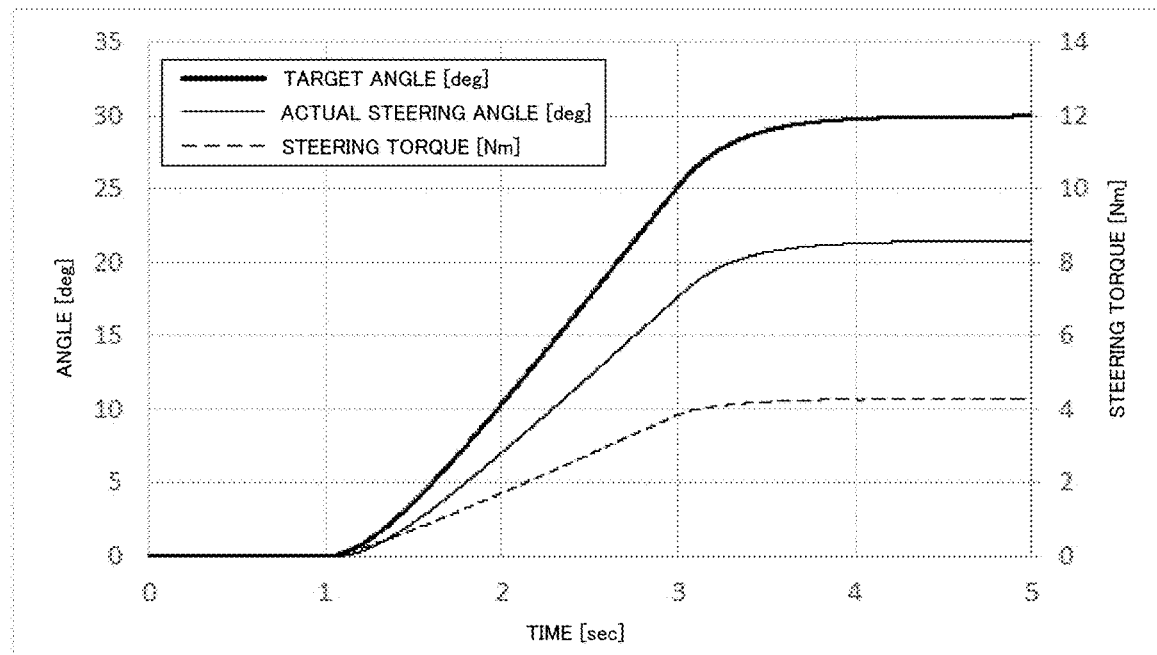
FIG. 21 is a graph showing an example of time responses of a target angle, an actual steering angle and a steering torque in a simulation with respect to steering intervention compensation.

Assuming the steering angle command value θref to be constant at 0 [deg], a simulation of the automatic steering where the driver's target angle θarm is inputted is performed. As a reference, time responses of the actual steering angle θr and the steering torque Tt to a time change of the driver's target angle θarm in the simulation considering the steering model of the driver under the same conditions, are shown in FIG. 21. In FIG. 21, the vertical axis indicates an angle [deg] and a steering torque [Nm], the horizontal axis indicates a time [sec], the thick solid line shows the driver's target angle θarm, the thin solid line shows the actual steering angle (the handle angle in the present embodiment) θr, and the broken line shows the steering torque Tt. As well, in FIG. 21, the assist control output gradual-change gain Gft1 is "0%", that is, the assist control does not work. Further, FIG. 21 shows an example of a simulation for describing a situation where the actual steering angle θr and the steering torque Tt are changed as the driver's target angle θarm is changed.

With respect to changes of the actual steering angle θr and the steering torque Tt in the case of inputting the driver's target angle Gam like this, the case of performing velocity control by the PI-control without the steering intervention compensation and the case of performing the steering intervention compensation are compared. In the former case, the assist control output gradual-change gain Gft1 and the assist map gradual-change gain Gft2 are set to "100%" for a comparison with the present embodiment, and difference between the integral methods is verified. In the latter case, the assist control output gradual-change gain Gft1 is set to "0%". Further, in a conventional prior art (for example, Patent Document 1), an assist control command value is 0 [deg] in the steering control before the switching, however, since the steering intervention in this case is presumed to be more difficult than in the former case, this case is omitted.

Figure 22:
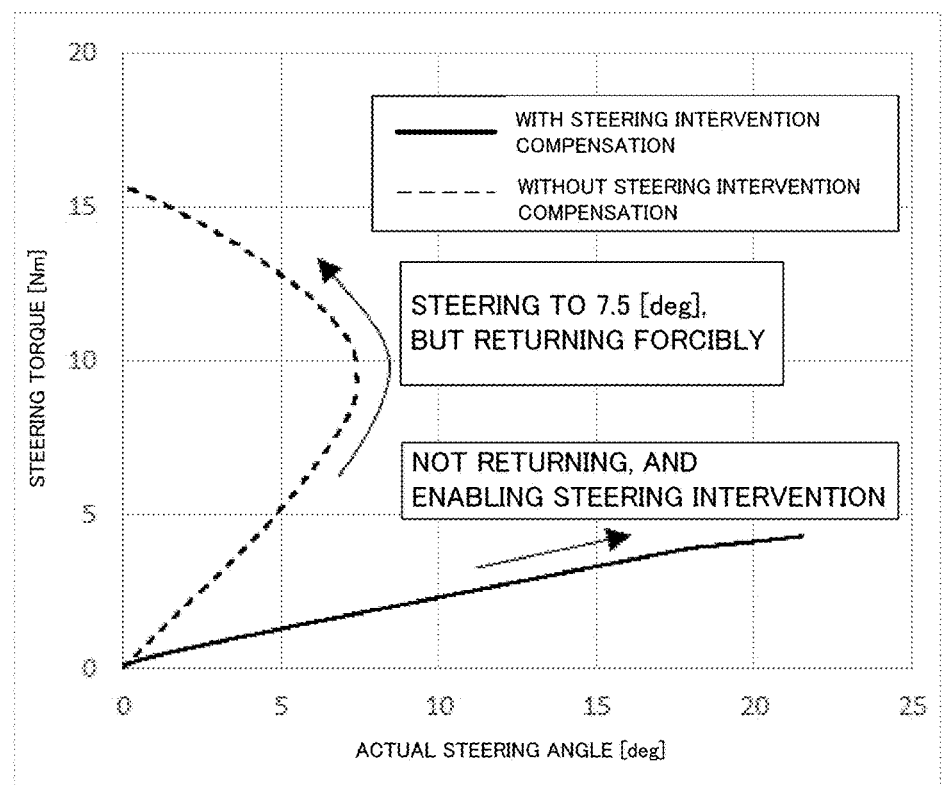
FIG. 22 is a graph showing an example of changing the actual steering angle and the steering torque in the simulation with respect to the steering intervention compensation.

A result of the simulation is shown in FIG. 22. The vertical axis indicates a steering torque [Nm], the horizontal axis indicates an actual steering angle [deg], the broken line shows the case without the steering intervention compensation, and the solid line shows the case with the steering intervention compensation. In the steering intervention compensating section 350, the steering intervention compensation map is set so as to linearly change from an origin.

As shown by the broken line in FIG. 22, in the case without the steering intervention compensation, the steering can be performed until the actual steering angle θr becomes 7.5 [deg], however, since a velocity deviation (a deviation between the steering angular velocity command value and the actual steering angular velocity) is continuously stored by the influence of the integral of the PI-control in the velocity control, the steering forcibly returns to the position corresponding to the steering angle command value θref (=0 [deg]) eventually. Moreover, a very large steering torque being larger than or equal to 15 [Nm] occurs, and the steering by the driver becomes difficult.

On the contrary, as shown by the solid line in FIG. 22, in the case with the steering intervention compensation, the steering can be performed until the actual steering angle θr becomes about 22 [deg], and does not return to the position corresponding to the steering angle command value θref (=0 [deg]). This is because the steering angular velocity command value ωref2 outputted from the steering intervention compensating section 350 is added to the steering angular velocity command value ωref1 outputted from the position control section 340, and the velocity deviation between the steering angular velocity command value ωref and the actual steering angular velocity ωr in the steering state balances in the vicinity of "0". Thus, the function of the steering intervention compensating section 350 enables the steering intervention by the driver. Further, an increase of the gain of the output from the steering intervention compensating section 350 enables easier steering.

Next, an effect for a handle vibration occurring in the steering angle control performed during the automatic steering in the case of performing only the steering angle control without the steering intervention by the driver (the handle manual input torque Th=0 [Nm]), will be described.

Before describing the effect for the handle vibration, the followability to the steering angle command value θref and the effect by the FF filter in the filter section 355 will be described in order to describe a situation where the actual steering angle θr follows the steering angle command value θref. Even in the simulation for verifying the present effects, in order to verify only the steering angle control characteristic, the setting that neither the steering intervention by the driver nor the steering intervention compensation is performed is adopted.

Figure 23:
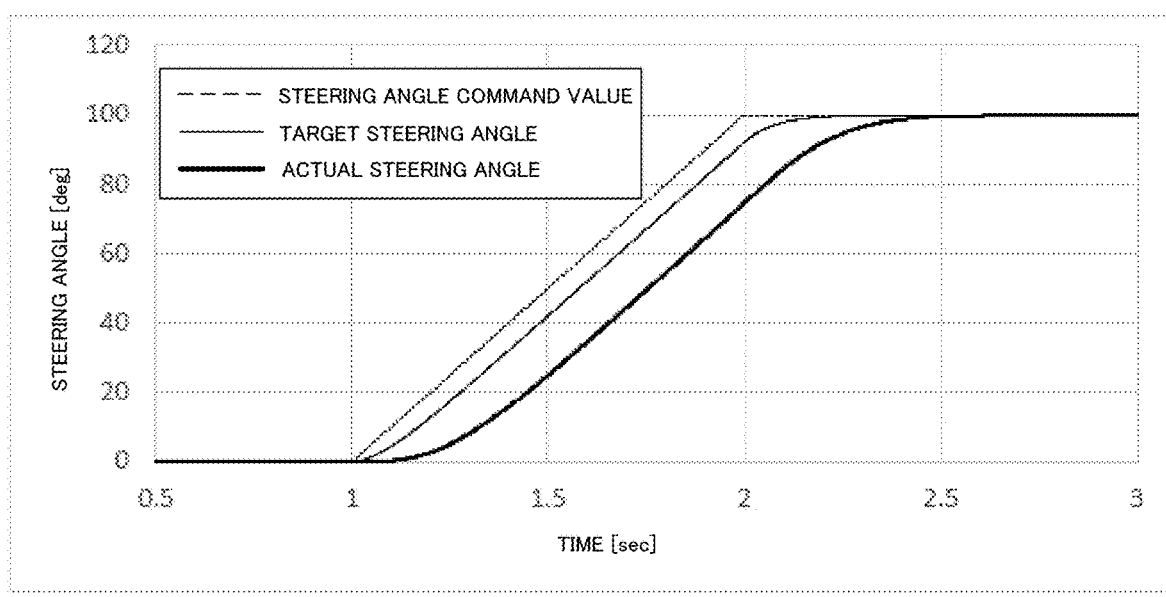
FIG. 23 is a graph showing a result of a simulation with respect to followability to a steering angle command value.

FIG. 23 shows an example of a time response in the case of changing the steering angle command value θref from 0 [deg] to 100 [deg] in a ramp state. In FIG. 23, the vertical axis indicates a steering angle [deg], the horizontal axis indicates a time [sec], and the dotted line shows the steering angle command value θref. Situations of responses of the target steering angle θt outputted from the handle vibration eliminating section 330 having a primary LPF whose cutoff frequency is 2 [Hz] and the actual steering angle θr to the steering angle command value θref, are shown by the thin solid line and the thick solid line respectively. From FIG. 23, it is found out that the target steering angle θt and the actual steering angle θr follow the steering angle command value θref.

From the above description, it can be said that both the steering intervention and the follow-up of the steering angle during the automatic steering can be achieved.

Figure 24A:
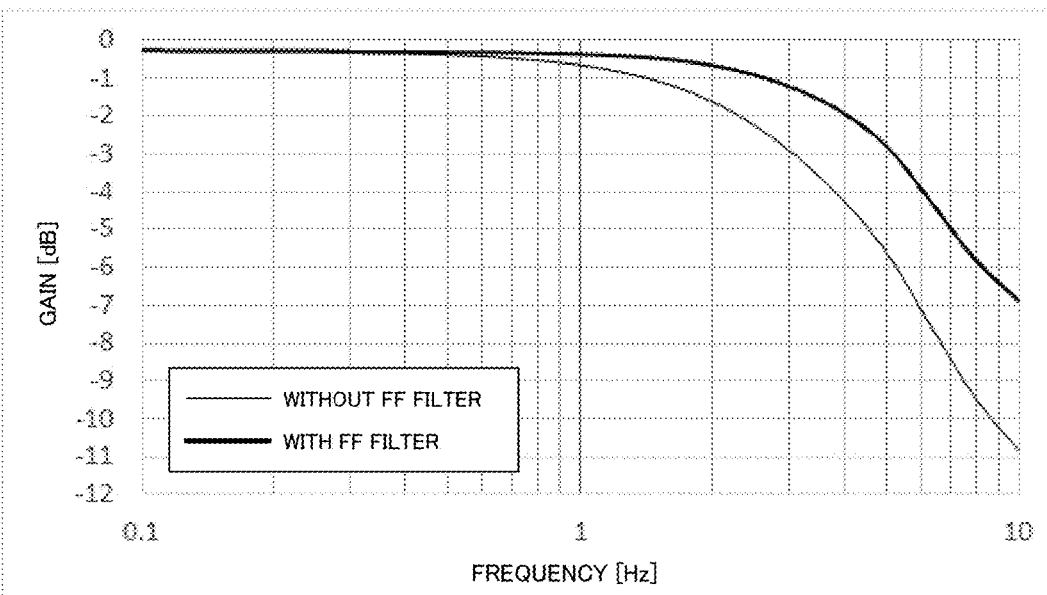
FIGS. 24A and 24B are characteristic diagrams showing an example of a frequency characteristic from a steering angular velocity command value to an actual steering angular velocity in a simulation with respect to a feed-forward (FF) filter.
Figure 24B:
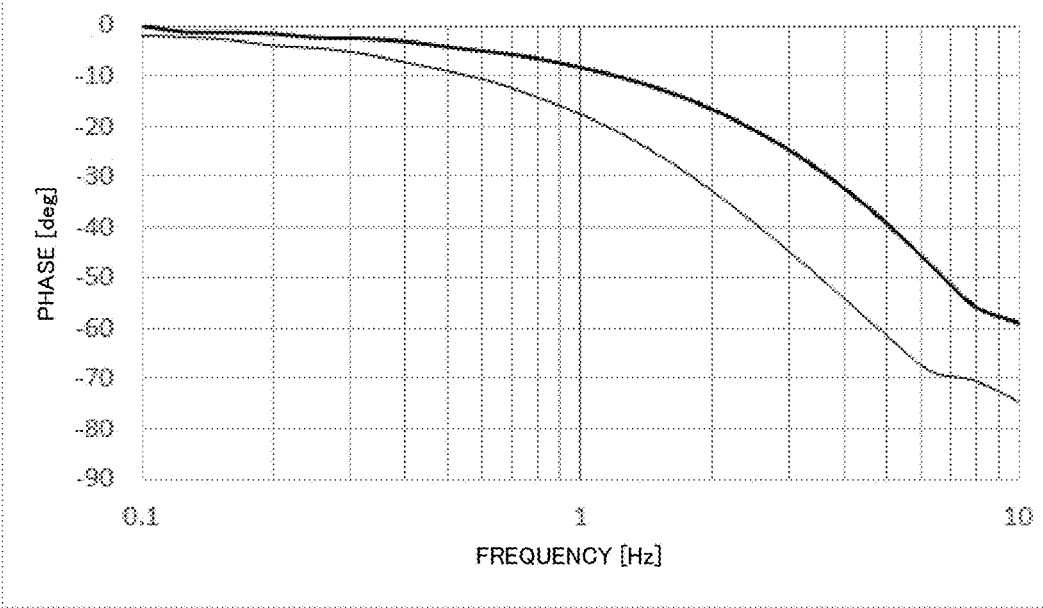

In the simulation of the FF filter, first, frequency characteristics from the steering angular velocity command value ωrefa to the actual steering angular velocity θr are compared in the case without the FF filter and in the case with the FF filter. As the FF filter, a filter which performs phase advance compensation and where a cutoff frequency of a numerator is 3.0 [Hz] and a cutoff frequency of a denominator is 5.0 [Hz], is used, and the case without the FF filter is simulated by using a gain whose magnitude is "1". The result is shown in FIGS. 24A and 24B. FIG. 24A shows a gain characteristic, FIG. 24B shows a phase characteristic, the thin solid line shows the case without the FF filter, and the thick solid line shows the case with the FF filter. In the case of defining a response frequency (a threshold frequency) of the steering angular velocity control as a frequency where the gain is attenuated to "−3" [dB], the response frequency is about 3.0 [Hz] in the case without the FF filter (shown by the thin solid line), is about 5.0 [Hz] in the case with the FF filter (shown by the thick solid line), and becomes a higher value in the case with the FF filter. Therefore, it can be found out that the response of the steering angular velocity control is improved by the FF filter.

Figure 25A:
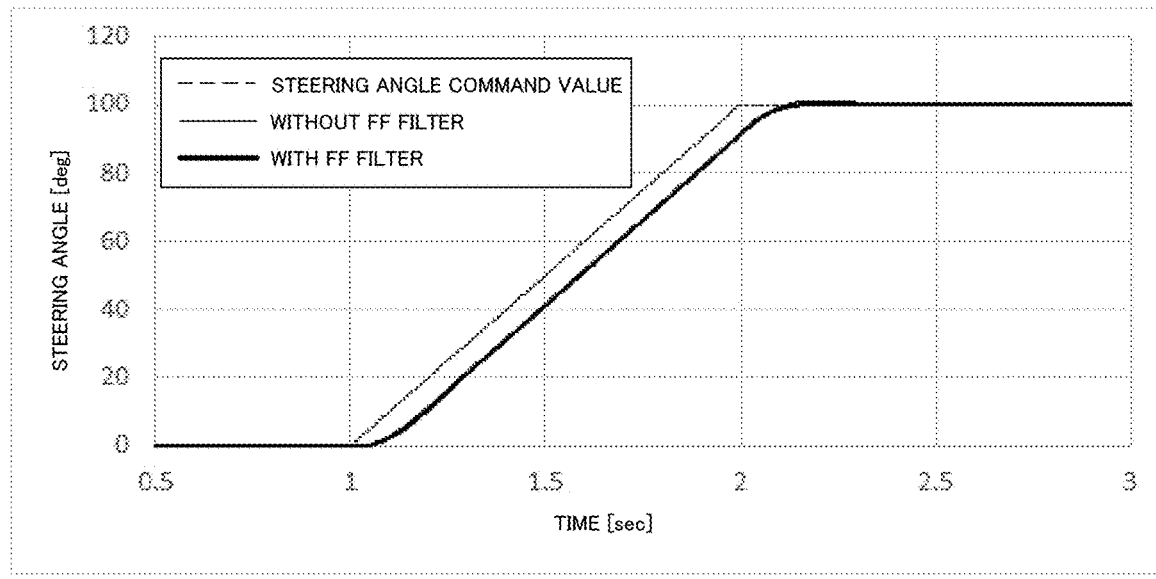
FIGS. 25A and 25B are graphs showing a result of the simulation with respect to the FF filter.
Figure 25B:
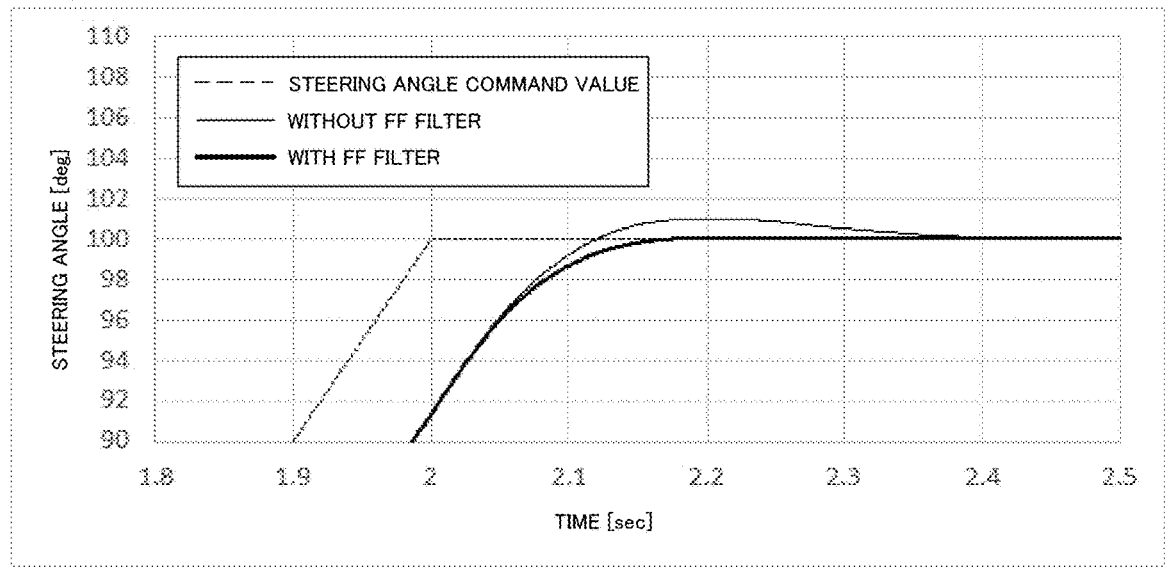

The proportional gain Kpp used in the position control section 340 of the steering angle control section 300 is possible to increase by using the FF filter. This leads to an effect of enabling improvement of the responsiveness of the steering angle control. In order to verify this effect, a simulation is performed by changing the simulation conditions set for the time response of the steering angle control shown in FIG. 23. Concretely, the proportional gain Kpp is doubled, and it is assumed that the handle vibration eliminating section 330 does not exist by using a gain whose magnitude is "1" as the handle vibration eliminating section 330. Time responses under these conditions are shown in FIGS. 25A and 25B. As with FIG. 23, FIGS. 25A and 25B show the time responses in the case of changing the steering angle command value θref from 0 [deg] to 100 [deg] in a ramp state, the vertical axis indicates a steering angle [deg], the horizontal axis indicates a time [sec], and the dotted line shows the steering angle command value θref. With respect to the steering angle command value θref, the time response in the case without the FF filter is shown by the thin solid line, and the time response in the case with the FF filter is shown by the thick solid line. To clarify a difference, the graph obtained by enlarging a part of FIG. 25A is shown in FIG. 25B. From FIGS. 25A and 25B, it is found out that the steering angle overshoots from 2.1 [sec] past to about 2.4 [sec] in the case without the FF filter, however, the steering angle follows the steering angle command value θref without overshooting in the case with the FF filter. Since the responsiveness of the steering angular velocity control is improved by using the FF filter, the overshoot becomes hard to occur even if the proportional gain Kpp is increased. As a result, the responsiveness of the steering angle control can be improved. Similarly, the responsiveness of the steering intervention can be also improved.

Figure 26:
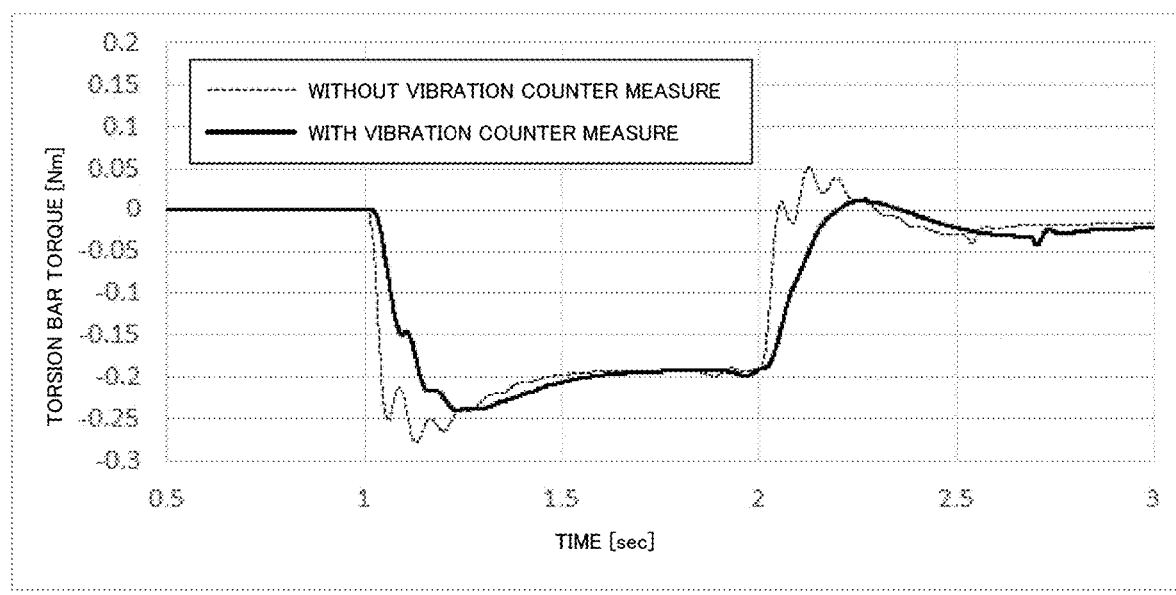
FIG. 26 is a graph showing a result of the simulation with respect to the handle vibration.

In the simulation for verifying the effect for the handle vibration, a difference of a time response of the torsion bar torque between with and without the handle vibration eliminating section 330 and the handle damping section 380, is examined in the case of performing the steering angle control with respect to the same steering angle command value θref as shown in FIGS. 23, 25A and 25B. The handle vibration eliminating section 330 uses the primary LPF whose cutoff frequency is 2 [Hz]. The handle damping section 380 uses the gain Kv by which a torque converted into a column shaft becomes equivalent to 10 [Nm] for the torsion bar torque being 1 [Nm], and performs phase lead compensation by a primary filter where a cutoff frequency of a numerator is 10 [Hz] and a cutoff frequency of a denominator is 20 [Hz]. The result is shown in FIG. 26. In FIG. 26, the vertical axis indicates a torsion bar torque [Nm], the horizontal axis indicates a time [sec], the solid line shows the case with the vibration countermeasure by the handle vibration eliminating section 330 and the handle damping section 380, and the dotted line shows the case without the vibration countermeasure. From FIG. 26, it is found out that the handle vibration is suppressed by the handle vibration eliminating section 330 and the handle damping section 380.

As the last of the description on the effect, an effect for a problem that the integral value of the I-control accumulates excessively due to the increase in the steering angular velocity at the start of the steering angle control and the steering angle control command value may become excessive (the problem in Patent Document 3 and so on), will be described.

Figure 27:
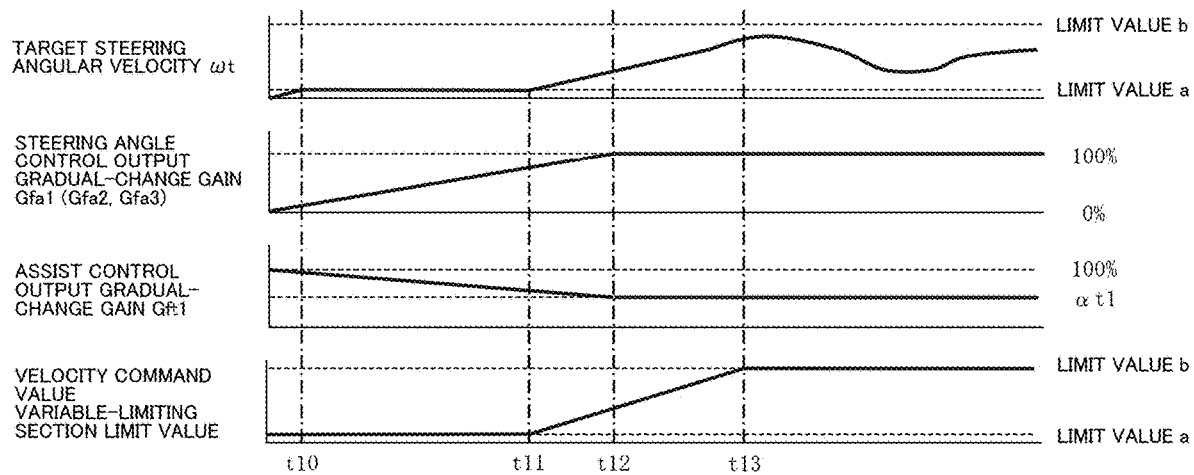
FIG. 27 is a graph showing a changing example of a target steering angular velocity, gradual-change gains and a limit value in the case of shifting a steering state.

FIG. 27 shows time changes of the target steering angular velocity ωt, the gradual-change gains and the limit value used at the velocity command value variable-limiting section 360 when the state changes from the manual steering state to the automatic steering state. Assuming that the velocity control gradual-change gain Gfa2 and the velocity command gradual-change gain Gfa3 are changed I synchronous with the steering angle control output gradual-change gain Gaf1, only the gradual-change gain Gaf1 is shown in FIG. 27. Assuming that the assist control output gradual-change gain Gft1 and the assist map gradual-change gain Gft2 are also changed in synchronous with the gradual-change gain Gfa1, only the situation of the change of the gradual-change gain Gft1 is shown as a reference. Further, the magnitude of the limit value used at the velocity command value variable-limiting section 360 is set so as to be fixed at a small value when the gradual-change gain Gfa3 is smaller than the predetermined threshold, and gradually increase when the gradual-change gain Gfa3 is larger than or equal to the predetermined threshold.

The steering angular velocity command value ωref is multiplied with the velocity command gradual-change gain Gfa3, is limited at the velocity command value variable-limiting section 360, and becomes the target steering angular velocity ωt. When the transference from the manual steering state to the automatic steering state starts, the velocity command gradual-change gain Gfa3 gradually increases from "0" and the target steering angular velocity ωt also gradually increases from "0". Thereafter, when the steering angular velocity command value ωrefg inputted into the velocity command value variable-limiting section 360 reaches the limit value (the limit value "a") at a time point t10, the target steering angular velocity ωt becomes constant at the limit value "a", however, the gradual-change gain Gfa3 continuously increases. When the gradual-change gain Gfa3 becomes the predetermined threshold at a time point t11, the limit value gradually increases, and the target steering angular velocity ωt also increases correspondingly.

When the gradual-change gain Gfa3 becomes "100%" at a time point t12, in addition, the limit value becomes the limit value "b" at a time point t13, the target steering angular velocity ωt changes within the limit value "b". Since the target steering angular velocity ωt is limited by the limit value "a" and is limited by multiplication of the velocity control gradual-change gain Gfa2 at the steering angular velocity control section 370 between the time points t10 and t13, excessive accumulation of the integral value in the steering angular velocity control section 370 is suppressed, and the current command value causing the uncomfortable feeling to the driver as an output of the steering angle control can be reduced. After the transition of the limit value is ended (that is, after the time point t13), the steering angular velocity command value ωref is not limited by the gradual-change gain Gfa3 and the velocity command value variable-limiting section 360, and a signal in the steering angular velocity control section 370 is not also limited by the gradual-change gain Gfa2, so that it is possible to shift to the normal steering angle control.

Moreover, with respect to the multiplications of the respective gradual-change gains (Gfa1 to Gfa4, Gft1 and Gft2) in the first embodiment, in such a case of focusing on a cost more than the effect by the multiplication of the gradual-change gain, it is possible to leave at least one multiplication and omit other multiplications. Further, the respective limiting sections (the steering angle command value variable-limiting section, the variable-rate limiting section, the velocity command value variable-limiting section and the steering angle control current command value limiting section) are also possible to omit in the same case or the like. When the steering angle command value variable-limiting section 310, the variable-rate limiting section 320 and the multiplying section 391, in addition, the handle vibration eliminating section 330 are omitted, the steering angle command value θref is inputted into the position control section 340 as the target steering angle θt. When the multiplying section 392 and the velocity command value variable-limiting section 360 are omitted, the steering angular velocity command value ωref is inputted into the steering angular velocity control section 370 as the target steering angular velocity ωt.

Next, the second embodiment of the present invention will be described.

Figure 28:
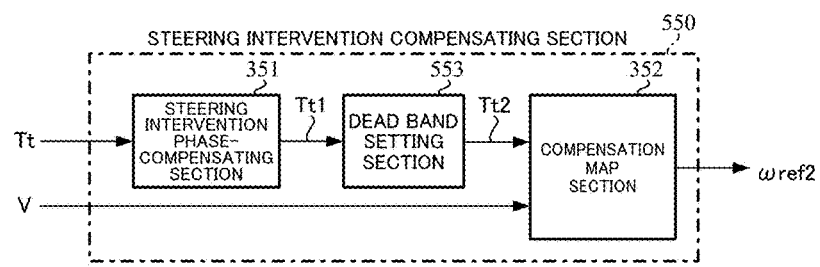
FIG. 28 is a block diagram showing a configuration example (the second embodiment) of the steering intervention compensating section.

In order to expedite the manual input judgment, a dead band to the steering torque is set in the steering intervention compensating section. To achieve this, in comparison with the first embodiment, a configuration of the steering intervention compensating section is different. A configuration example of the steering intervention compensating section 550 in the second embodiment is shown in FIG. 28. Compared with the steering intervention compensating section 350 in the first embodiment shown in FIG. 10, a dead band setting section 553 is inserted between the steering intervention phase-compensating section 351 and the compensation map section 352. The steering torque Tt1 outputted from the steering intervention phase-compensating section 351 is inputted into not the compensation map section 352 but the dead band setting section 553, and a steering torque Tt2 outputted from the dead band setting section 553 is inputted into the compensation map section 352. Other configurations are the same as those of the first embodiment.

Figure 29:
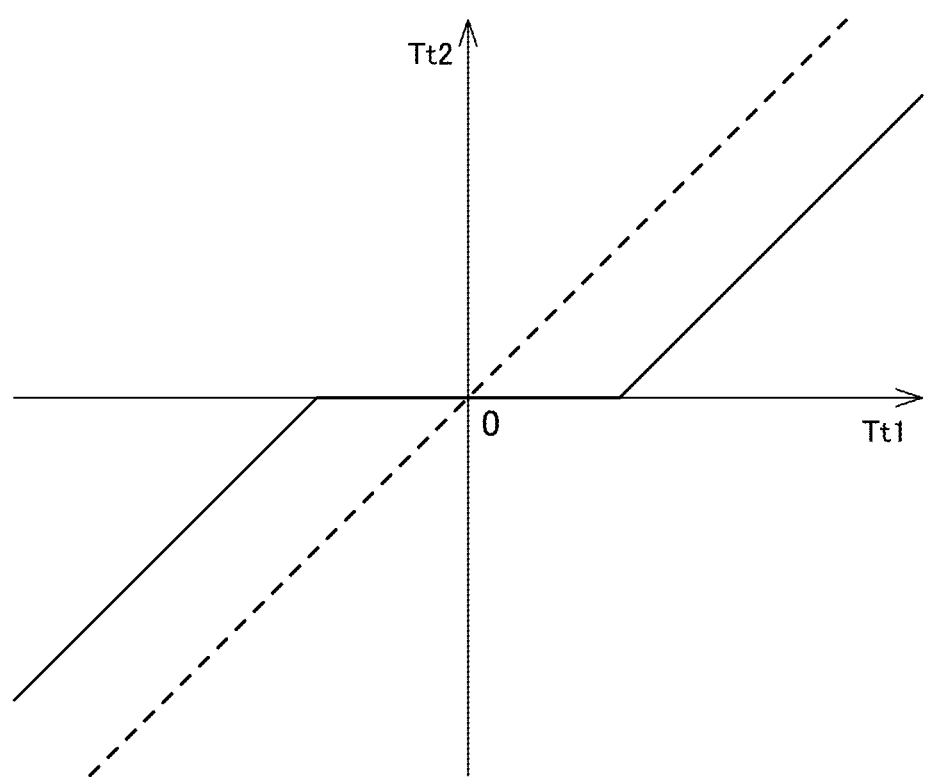
FIG. 29 is a characteristic diagram showing a setting example of a dead band for the steering torque in the steering intervention compensating section.

The dead band setting section 553 sets the dead band to the steering torque Tt1 and outputs the operated steering torque as the steering torque Tt2. For example, the dead band shown in FIG. 29 is set. That is, in the case of not setting the dead band, the steering torque Tt1 is outputted as the steering torque Tt2, as shown by the broken line. By setting the dead band in the range that the steering torque Tt1 is in the vicinity of zero, as shown by the solid line, the value of the steering torque Tt2 is zero in the above range and changes the value with the same gradient of the broken line out of the above range so that the steering torque Tt2 changes in conjunction with the steering torque Tt1. By setting such a dead band, the steering angular velocity command value ωref2 outputted from the subsequent compensation map section 352 is also zero in the above range and the steering intervention compensation is not performed. Thus, when the steering intervention by the driver is occurred, the steering torque easily increases up to the threshold of the dead band. As a result, the manual input judgement is performed at an early timing. The magnitude of the positive threshold in the dead band may not the same as that of the negative threshold in the dead band.

Compared with the operating example of the first embodiment, an operating example of the second embodiment is different in that the operation of the dead band setting section 553 is added to the operations of the steering intervention compensating section during operating the steering angle control section. That is, in the operating example of the steering angle control section 300 in the first embodiment shown in FIGS. 18 and 19, the second embodiment performs the same operations as the first embodiment until the step S580 where the steering intervention phase-compensating section 351 converts the steering torque Tt into the steering torque Tt1, and the steering torque Tt1 is inputted into the dead band setting section 553. The dead band setting section 553 sets the dead band to the steering torque Tt1 by using the characteristic shown in FIG. 29 and outputs the operated steering torque as the steering torque Tt2 to the compensating map section 352. The operations (from the Step S590) after the vehicle speed V and the steering torque Tt2 are inputted into the compensating map section 352 are the same as the first embodiment.

As well, the dead band setting section 553 may be disposed at the preceding stage of the steering intervention phase-compensating section 351. Even if the dead band setting section 553 is removed and the map having the dead band is used as the steering intervention compensating map (the map that the output value within the setting range is zero to the input torque), the same effect can be obtained.

An effect of the dead band in the steering intervention compensation by adding the dead band setting section 553 in the second embodiment will be described.

Figure 30:
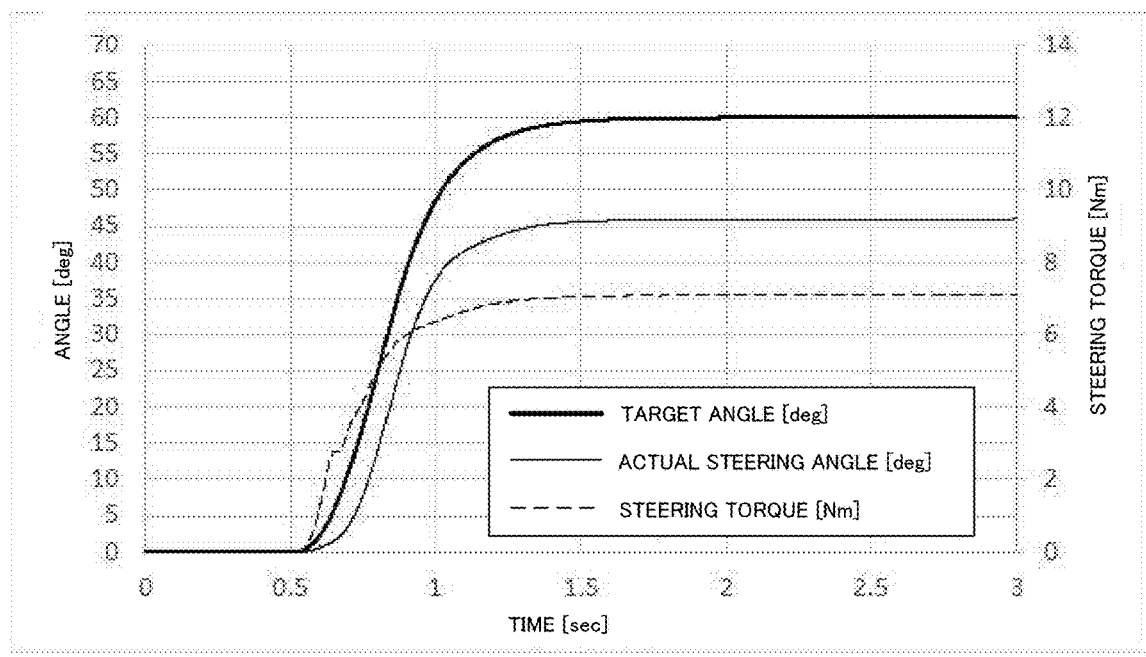
FIG. 30 is a graph showing an example of time responses of a target angle, an actual steering angle and a steering torque in a simulation with respect to the dead band.

Assuming the steering for an emergency avoidance, the simulation is performed by inputting the driver's target angle θarm as shown in FIG. 30. In FIG. 30 as well as FIG. 21, the vertical axis indicates the angle [deg] and the steering torque [Nm], the horizontal axis indicates the time [sec], the thick solid line shows the driver's target angle θarm, and the thin solid line and the broken line show the time responses of the actual steering angle θr and the steering torque Tt to the time change of the driver's target angle θarm, respectively. As shown in the thick solid line of FIG. 30, the driver's target angle θarm rises from 0.5 [sec] and changes up to 60 [deg].

Figure 31:
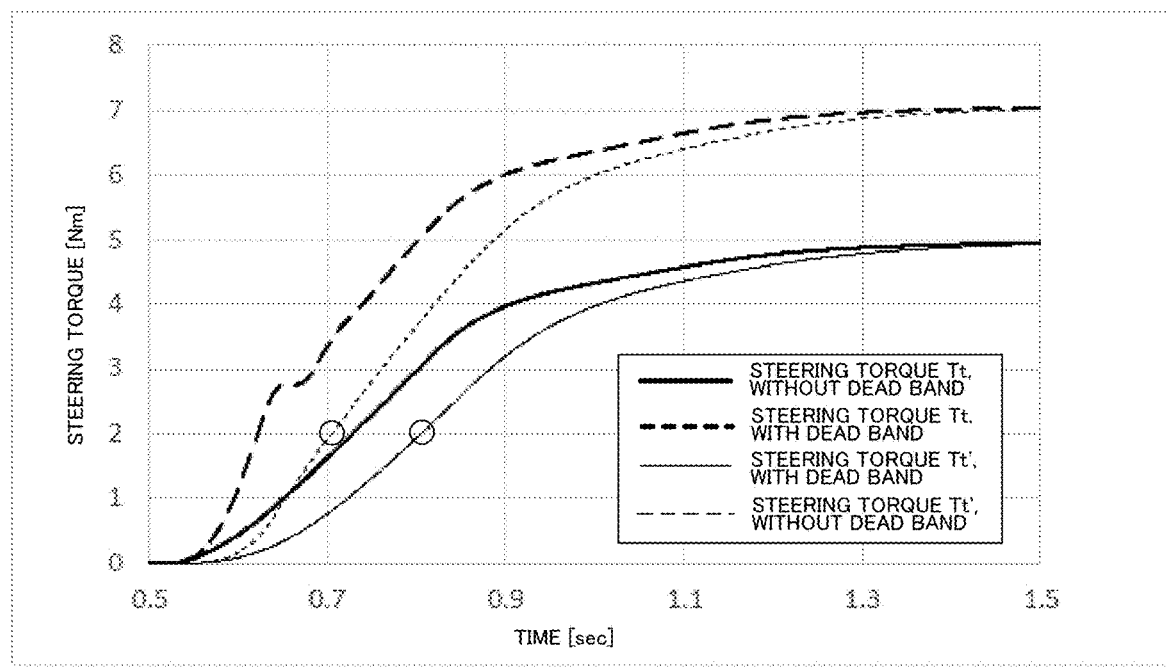
FIG. 31 is a graph showing a result of time response of the steering torque in a simulation with respect to the dead band.

In the case that such a driver's target angle θarm is inputted, the case that positive and negative thresholds having +2.5 [Nm] and −2.5 [Nm] of the steering torque Tt1 are set as the dead band is compared with the case of no dead band. The comparison result is shown in FIG. 31. The manual input judging section 223 in the switch judging and gradual-change gain generating section 220 smooths the steering torque Tt by using the smoothing filter section 225 where the primary LPF whose cutoff frequency is 1.5 [Hz] and the primary LPF whose cutoff frequency is 3.0 [Hz] are connected in series. When the absolute value |Tt'| of the smoothed steering torque Tt' is larger than or equal to the threshold Tth that is set to 2.0 [Nm], it is judged that "presence of the manual input".

In FIG. 31, the vertical axis indicates the steering torque [Nm], the horizontal axis indicates the time [sec], the thick solid line shows the steering torque Tt in the case without the dead band, the broken line shows the steering torque Tt in the case with the dead band, the dotted line shows the steering torque Tt' in the case with the dead line, and the thin solid line shows the steering torque Tt' in the case without the dead line. In FIG. 31, the portions that are enclosed in the circles are the time when the absolute value of the steering torque Tt' reaches the threshold Tth. The timings when "presence of the manual input" is judged are about 0.7 [sec] in the case with the dead band and about 0.8 [sec] in the case without the dead band. The case with the dead band can be verified by about 0.1 [sec] faster than the case without the dead band. Thus, by disposing the dead band, faster judgement can be performed.

Other embodiments of the present invention will be described.

Although the multiplication of the velocity control gradual-change gain Gfa2 at the steering angular velocity control section 370 is performed for the control amount Ir1 outputted from the integrating section 373 in the first embodiment, it can be performed for the steering angle control current command value IrefW outputted from the subtracting section 375.

Figure 32:
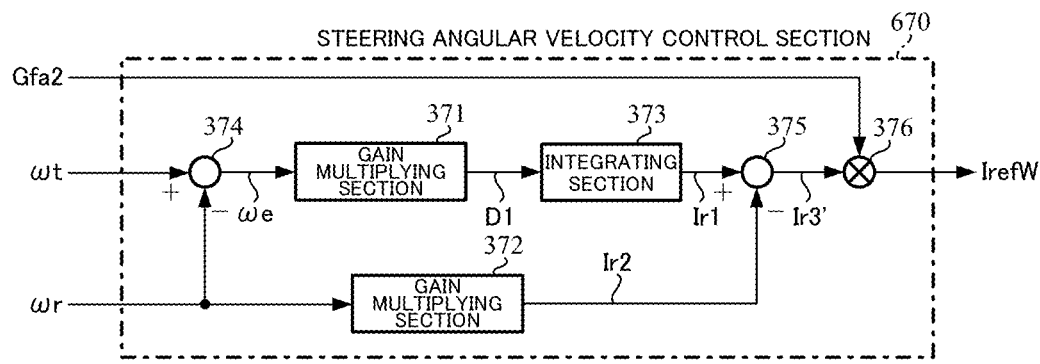
FIG. 32 is a block diagram showing a configuration example (the third embodiment) of the steering angular velocity control section.

FIG. 32 shows a configuration example (the third embodiment) of the steering angular velocity control section in the case of multiplying the steering angle control current command value IrefW with the velocity control gradual-change gain Gfa2. In comparison with the steering angular velocity control section 370 in the first embodiment shown in FIG. 13, in a steering angular velocity control section 670 of the third embodiment, the multiplying section 376 is provided not behind the integrating section 373 but behind the subtracting section 375, and the other configurations are the same.

Figure 18:
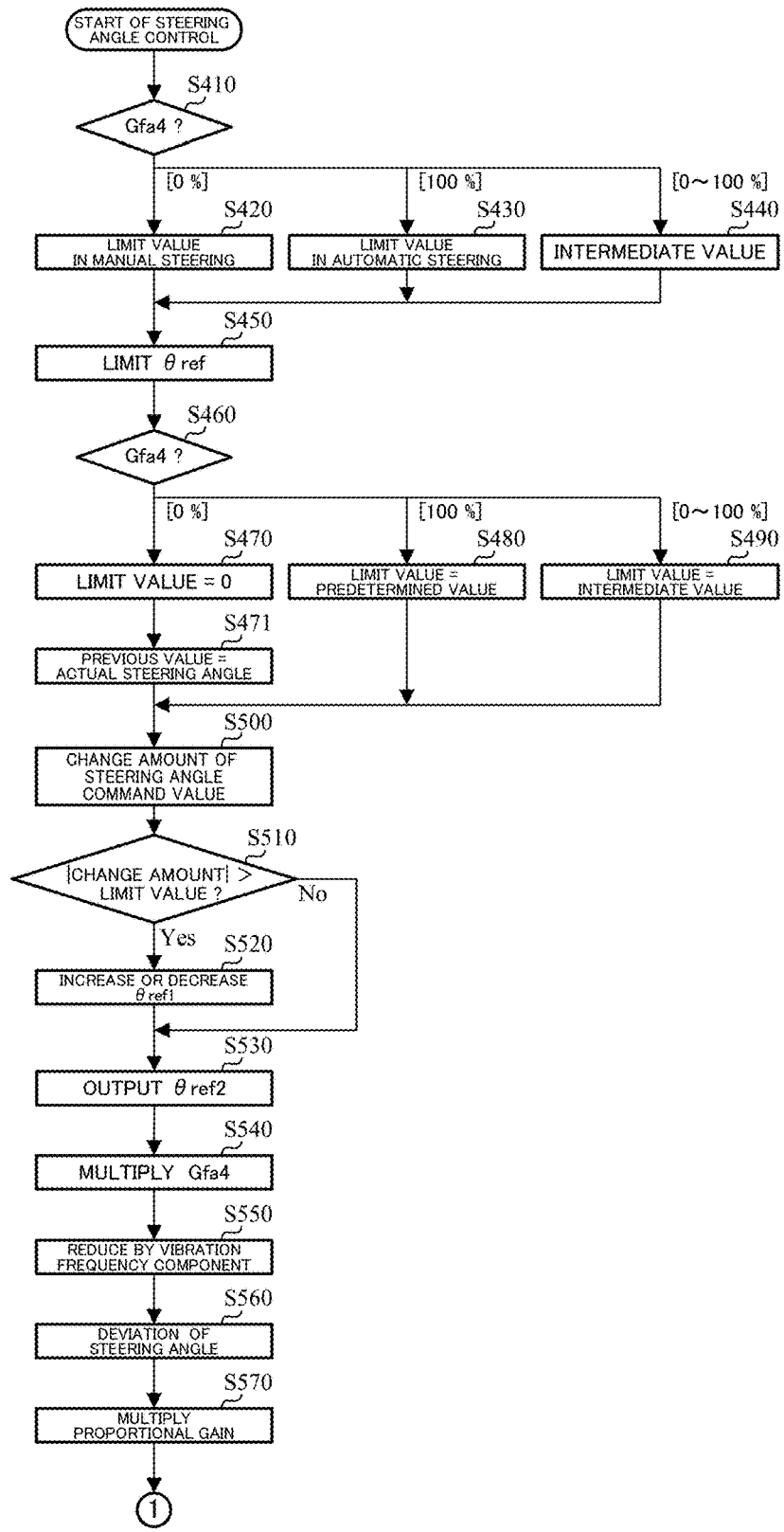
FIG. 18 is a flowchart showing a part of an operating example (the first embodiment) of the steering angle control section.
Figure 19:
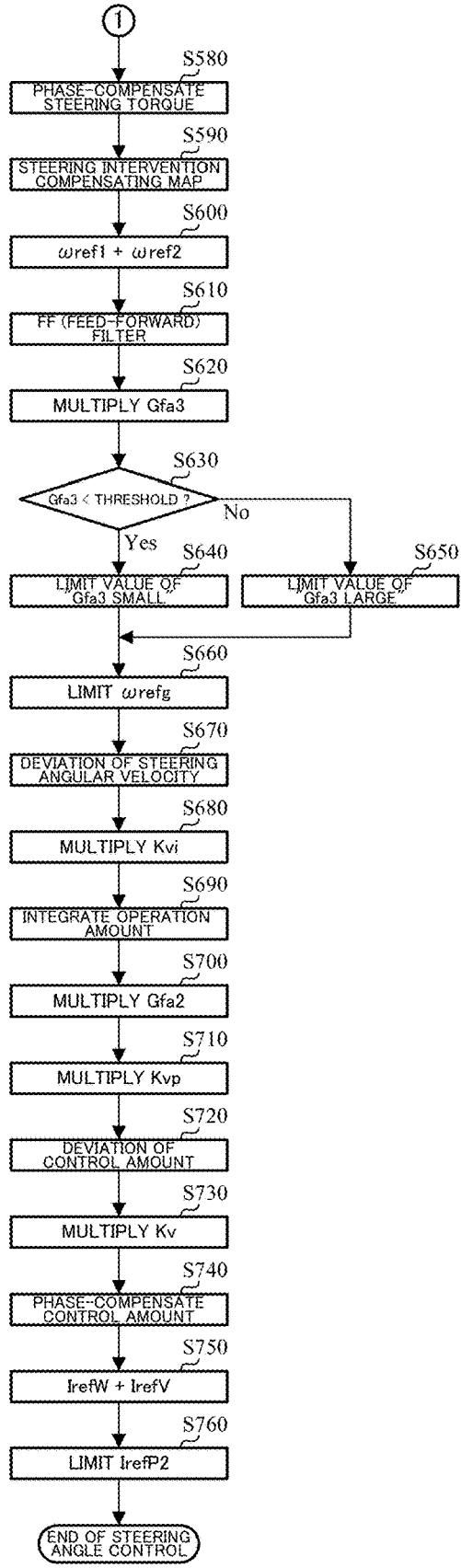
FIG. 19 is a flowchart showing a part of the operating example (the first embodiment) of the steering angle control section.

An operating example of the steering angular velocity control section 670 in the third embodiment performs the same operations as the operating example of the first embodiment shown in FIGS. 18 and 19 until the Step S690 where the integrating section 373 integrates the operation amount D1 and calculates the control amount Ir1, after that, the control amount Ir1 is inputted into the subtracting section 375, and a control amount Ir3' is calculated as a deviation (=Ir1−Ir2) between the control amounts Ir1 and Ir2. The multiplying section 376 multiplies the control amount Ir3' with the velocity control gradual-change gain Gfa2, and outputs the multiplied result as the steering angle control current command value IrefW to the adding section 394. The operations (from the Step 730) after that are the same as the first embodiment.

It is possible to perform the multiplication of the velocity control gradual-change gain Gfa2 at another position in the steering angular velocity control section 370.

Figure 33:
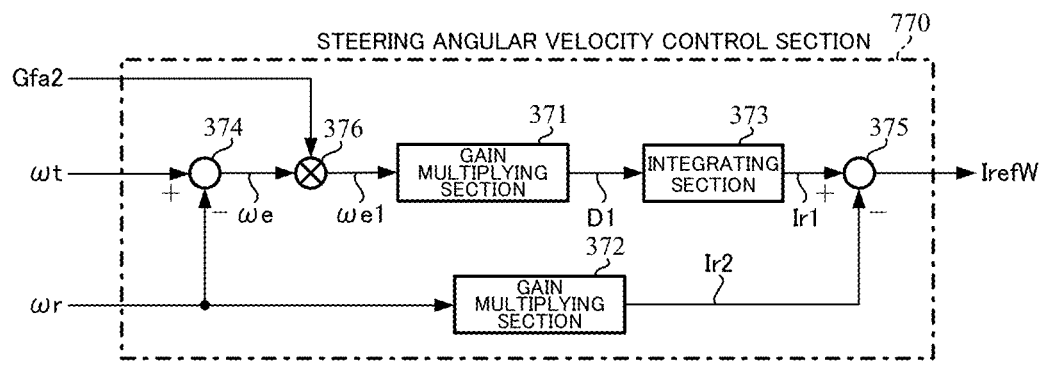
FIG. 33 is a block diagram showing a configuration example (the fourth embodiment) of the steering angular velocity control section.

A configuration example (the fourth embodiment) of a steering angular velocity control section shown in FIG. 33 multiplies the deviation ωe outputted from the subtracting section 374 with the velocity control gradual-change gain Gfa2. Compared with the steering angular velocity control section 370 in the first embodiment shown in FIG. 13, in a steering angular velocity control section 770 of the fourth embodiment, the multiplying section 376 is provided not behind the integrating section 373 but behind the subtracting section 374, and the other configurations are the same.

An operating example of the steering angular velocity control section 770 in the fourth embodiment performs the same operations as the operating example of the first embodiment shown in FIGS. 18 and 19 until the step S670 where the subtracting section 374 calculates the deviation ωe between the target steering angular velocity ωt and the actual steering angular velocity ωr, and the deviation ωe is inputted into not the gain multiplying section 371 but the multiplying section 376. The multiplying section 376 multiplies the deviation ωe with the velocity control gradual-change gain Gfa2, and outputs the multiplied result as a deviation ωe1 to the gain multiplying section 371. The operations after that are the same as the first embodiment except to remove the Step S700.

Figure 34:
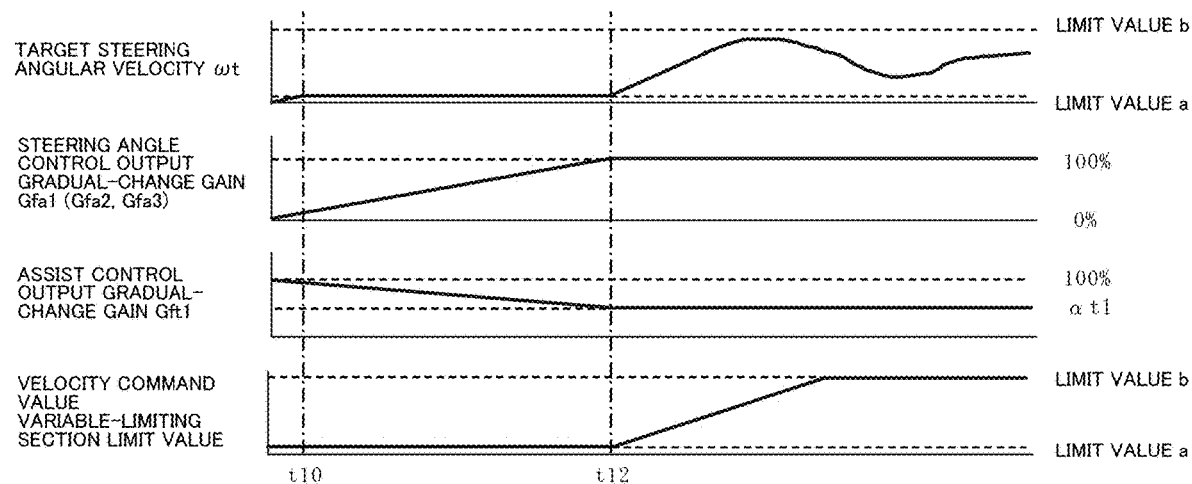
FIG. 34 is a graph showing a changing example (the fifth embodiment) of a target steering angular velocity, gradual-change gains and a limit value in the case of shifting a steering state.

In the above embodiments (the first to the fourth embodiments), the velocity command value variable-limiting section 360 sets the limit values depending on the velocity command gradual-change gain Gfa3, and switches the limit values when the Gfa3 becomes the predetermined threshold. However, a velocity command value variable-limiting section uses the steering angle control output gradual-change gain Gaf1 instead of the gradual-change gain Gfa3, and may switch the limit values when the gradual-change gain Gaf1 becomes "100%". In a configuration (the fifth embodiment) of this case, the gradual-change gain Gaf1 is inputted into the velocity command value variable-limiting section instead of the gradual-change gain Gfa3, and the other configurations are the same as the other embodiments. In an operation of the fifth embodiment, a judgment operation of determining limit values at the velocity command value variable-limiting section (the Step S630 shown in FIG. 19) is changed to a confirmation of whether or not the gradual-change gain Gaf1 is smaller than "100%". In the fifth embodiment, time changes of the target steering angular velocity cot, the gradual gains and the limit value of the velocity command value variable-limiting section in the case of changing the state from the manual steering state to the automatic steering state, become as shown in FIG. 34. Compared with the time changes shown in FIG. 27, the limit value of the velocity command value variable-limiting section gradually increases from the time point t12 where the gradual-change gain Gaf1 becomes "100%", and the target steering angular velocity cot also increases correspondingly.

EXPLANATION OF REFERENCE NUMERALS 1 handle (steering wheel)
2 column shaft (steering shaft, handle shaft)
10 torque sensor
12 vehicle speed sensor
13 battery
20 motor
21 rotational angle sensor
30 control unit (ECU)
31 current command value calculating section
33 current limiting section
34 compensation signal generating section
35 PI-control section
36 PWM-control section
37 inverter
38 motor current detector
100 vehicle-side ECU
110 vehicle-state quantity detecting section
120 switch command section
130 target track calculating section
140 vehicle motion control section
141 steering angle command value generating section
200 EPS-side-ECU
210 EPS-state quantity detecting section
220 switch judging and gradual-change gain generating section
221 switch judging section
222 gradual-change gain generating section
223 manual input judging section
224 steering state judging section
225 smoothing filter section
226 absolute value processing section
227 judgment processing section
230 assist control section
240 switching section
250 current control and driving section
300 steering angle control section
310 steering angle command value variable-limiting section
320 variable-rate limiting section
330 handle vibration eliminating section
340 position control section
341 proportional gain section
350, 550 steering intervention compensating section
351 steering intervention phase-compensating section
352 compensation map section
355 filter section
360 velocity command value variable-limiting section
370, 670, 770 steering angular velocity control section
371, 372 gain multiplying section
373 integrating section
380 handle damping section
381 gain section
382 damping phase compensating section
390 steering angle control current command value limiting section
400 plant
553 dead band setting section

The invention claimed is:

1. An electric power steering apparatus that drives a motor based on a current command value, and performs an assist control and a steering angle control for a steering system by drive-controlling said motor, comprising:
   a steering angle control section that calculates a steering angle control current command value for said steering angle control based on at least a steering angle command value and an actual steering angle,
   wherein said steering angle control section comprises:
   a position control section that calculates a basic steering angular velocity command value based on said steering angle command value and said actual steering angle;
   a steering intervention compensating section that obtains a compensatory steering angular velocity command value for a steering intervention compensation depending on a steering torque;
   a filter section that converts a steering angular velocity calculated from said basic steering angular velocity command value and said compensatory steering angular velocity command value into an extended steering angular velocity command value by using a feed-forward filter (an FF filter); and
   a steering angular velocity control section that calculates said steering angle control current command value based on said extended steering angular velocity command value and an actual steering angular velocity,
   wherein said steering intervention compensating section comprises:
   a compensation map section having a steering intervention compensation map that determines a characteristic of said compensatory steering angular velocity command value for said steering torque,
   wherein said steering intervention compensating section obtains said compensatory steering angular velocity command value from said steering torque through said compensation map section, and said electric power steering apparatus calculates said current command value by using at least said steering angle control current command value.

2. The electric power steering apparatus according to claim 1,
   wherein said steering intervention compensating section further includes a dead band setting section that sets values within a predetermined range to zero for said steering torque, and obtains said compensatory steering angular velocity command value from said steering torque through said dead band setting section and said compensation map section.

3. The electric power steering apparatus according to claim 2, further including a steering angle control current command value limiting section that limits said steering angle control current command value with a preset limit value.

4. The electric power steering apparatus according to claim 1,
   wherein said steering intervention compensation map has a characteristic that said compensatory steering angular velocity command value increases as said steering torque increases.

5. The electric power steering apparatus according to claim 1,
wherein said steering intervention compensation map has a characteristic that said compensatory steering angular velocity command value decreases as a vehicle speed increases.

6. The electric power steering apparatus according to claim 1,
wherein said steering intervention compensating section further includes a steering intervention phase compensating section that performs a phase compensation for said steering torque, and obtains said compensatory steering angular velocity command value from said steering torque through further said steering intervention phase compensating section.

7. The electric power steering apparatus according to claim 1,
wherein said steering angular velocity control section calculates said steering angle control current command value with an integral-proportional control (an I-P control) by using said extended steering angular velocity command value and said actual steering angular velocity.

8. The electric power steering apparatus according to claim 1,
wherein said position control section includes a proportional gain section that calculates said basic steering angular velocity command value by multiplying a deviation between said steering angle command value and said actual steering angle with a proportional gain.

9. The electric power steering apparatus according to claim 1,
wherein said electric power steering apparatus further includes an assist control section that calculates an assist control current command value for said assist control based on at least said steering torque, and calculates said current command value by said assist control current command value and said steering angle control current command value.

10. The electric power steering apparatus according to claim 9, wherein said assist control current command value is multiplies with an assist control output gradual-change gain for adjusting said assist control current command value.

11. The electric power steering apparatus according to claim 10, wherein an assist map output current obtained in said assist control section is multiplied with an assist map gradual-change gain.

12. The electric power steering apparatus according to claim 10, wherein only said steering angle control, for said steering system, is performed by multiplying said assist control current command value with said assist control output gradual-change gain being zero.

13. The electric power steering apparatus according to claim 9, wherein an assist map output current obtained in said assist control section is multiplied with an assist map gradual-change gain.

14. The electric power steering apparatus according to claim 1, further including a steering angle control current command value limiting section that limits said steering angle control current command value with a preset limit value.

* * * * *